US012570803B2

(12) United States Patent
Zhang et al.

(10) Patent No.: US 12,570,803 B2
(45) Date of Patent: Mar. 10, 2026

(54) COMPOSITION, SILICONE POLYETHER SURFACTANT FORMED THEREFROM, AND RELATED METHODS AND ARTICLES

(71) Applicants: DOW SILICONES CORPORATION, Midland, MI (US); DOW GLOBAL TECHNOLOGIES LLC, Midland, MI (US)

(72) Inventors: Fang Zhang, Midland, MI (US); Nanguo Liu, Midland, MI (US); Scott Boelter, Midland, MI (US); Travis Sunderland, Midland, MI (US); Weston Tulloch, Midland, MI (US); Simon Toth, Midland, MI (US); Zhenbin Niu, Midland, MI (US); Sachit Goyal, Lake Jackson, TX (US); Adebola Ogunniyi, Freeport, TX (US); Yang Cheng, Midland, MI (US)

(73) Assignees: DOW SILICONES CORPORATION, Midland, MI (US); DOW GLOBAL TECHNOLOGIES LLC, Midland, MI (US)

( * ) Notice: Subject to any disclaimer, the term of this patent is extended or adjusted under 35 U.S.C. 154(b) by 749 days.

(21) Appl. No.: 18/012,198

(22) PCT Filed: Jun. 24, 2021

(86) PCT No.: PCT/US2021/038831

§ 371 (c)(1),
(2) Date: Dec. 21, 2022

(87) PCT Pub. No.: WO2021/262940

PCT Pub. Date: Dec. 30, 2021

(65) Prior Publication Data

US 2023/0331923 A1 Oct. 19, 2023

Related U.S. Application Data

(60) Provisional application No. 63/043,295, filed on Jun. 24, 2020.

(51) Int. Cl.

| | |
|---|---|
| ***C08G 77/46*** | (2006.01) |
| ***C08G 65/08*** | (2006.01) |
| ***C08G 65/48*** | (2006.01) |
| ***C08G 77/08*** | (2006.01) |
| ***C08G 77/12*** | (2006.01) |
| ***C08J 9/00*** | (2006.01) |
| ***C08J 9/12*** | (2006.01) |

(Continued)

(52) U.S. Cl.

CPC ............. *C08G 77/46* (2013.01); *C08G 65/08* (2013.01); *C08G 65/48* (2013.01); *C08G 77/08* (2013.01); *C08G 77/12* (2013.01); *C08J 9/0042* (2013.01); *C08J 9/125* (2013.01); *C08J 9/141* (2013.01); *C08G 2101/00* (2013.01); *C08J 2203/10* (2013.01); *C08J 2203/14* (2013.01); *C08J 2375/08* (2013.01)

(58) Field of Classification Search

CPC ........ C08G 77/46; C08G 65/08; C08G 65/48; C08G 77/08; C08G 77/12; C08G 2101/00; C08G 18/163; C08G 18/1808; C08G 18/225; C08G 18/283; C08G 18/4804; C08G 18/485; C08G 18/5096; C08G 18/61; C08G 18/7664; C08G 65/336; C08G 18/7671; C08J 9/0042; C08J 9/125; C08J 9/141; C08J 2203/10; C08J 2203/14; C08J 2375/08; C08L 83/06; C08L 71/02

See application file for complete search history.

(56) References Cited

U.S. PATENT DOCUMENTS

| | | | |
|---|---|---|---|
| 3,159,601 | A | 12/1964 | Ashby |
| 3,220,972 | A | 11/1965 | Amoreau |
| 3,296,291 | A | 1/1967 | Chalk |

(Continued)

FOREIGN PATENT DOCUMENTS

| | | | |
|---|---|---|---|
| DE | 19631227 | C1 | 4/1998 |
| JP | H10182826 | A | 7/1998 |

(Continued)

OTHER PUBLICATIONS

International Search Report for PCT/US2021/038831 dated Oct. 20, 2021, 5 pages.

(Continued)

*Primary Examiner* — K. Boyle
(74) *Attorney, Agent, or Firm* — Warner Norcross + Judd LLP

(57) ABSTRACT

A composition is disclosed, which comprises (A) an organohydrogensiloxane having cyclic siloxane moieties including silicon-bonded hydrogen atoms. The composition further comprises (B) a polyether compound having an aliphatically unsaturated group. Finally, the composition comprises (C) a hydrosilylation catalyst. A silicone polyether surfactant prepared by reacting components (A) and (B) in the presence of component (C) is also disclosed. In addition, an isocyanate-reactive component comprising a polyol and the silicone polyether surfactant is disclosed. A composition comprising the isocyanate-reactive component, an isocyanate component comprising a polyisocyanate, and a catalyst is further disclosed. Finally, a method of preparing an article comprising a polyurethane and/or polyisocyanurate foam, and an article formed from the composition and/or the method, are disclosed.

18 Claims, No Drawings

(51) Int. Cl.

| | |
|---|---|
| ***C08J 9/14*** | (2006.01) |
| *C08G 101/00* | (2006.01) |

(56) References Cited

U.S. PATENT DOCUMENTS

| | | | | |
|---|---|---|---|---|
| 3,419,593 | A | 12/1968 | Willing | |
| 3,516,946 | A | 6/1970 | Modic | |
| 3,717,665 | A | 2/1973 | Stuart | |
| 3,814,730 | A | 6/1974 | Karstedt | |
| 3,989,668 | A | 11/1976 | Lee et al. | |
| 4,125,470 | A | 11/1978 | Fenton et al. | |
| 4,766,176 | A | 8/1988 | Lee et al. | |
| 4,784,879 | A | 11/1988 | Lee et al. | |
| 5,017,654 | A | 5/1991 | Togashi et al. | |
| 5,036,117 | A | 7/1991 | Chung et al. | |
| 5,041,468 | A * | 8/1991 | Budnik | C09K 23/54 528/37 |
| 5,175,325 | A | 12/1992 | Brown et al. | |
| 5,807,903 | A | 9/1998 | Stanga et al. | |
| 7,429,636 | B2 | 9/2008 | Asch et al. | |
| 7,449,536 | B2 | 11/2008 | Chapman et al. | |
| 8,541,514 | B2 | 9/2013 | Ferritto et al. | |
| 9,593,209 | B2 | 3/2017 | Dent et al. | |
| 2009/0258992 | A1 | 10/2009 | Yamamoto et al. | |
| 2014/0272995 | A1 | 9/2014 | Chia et al. | |
| 2015/0059102 | A1* | 3/2015 | Souda | C02F 1/547 210/732 |

FOREIGN PATENT DOCUMENTS

| | | | |
|---|---|---|---|
| WO | 2019055740 | A1 | 3/2019 |
| WO | 2020131369 | A1 | 6/2020 |

OTHER PUBLICATIONS

Machine assisted English translation of DE19631227C1 obtained from https://patents.google.com/patent on Dec. 13, 2022, 7 pages.

* cited by examiner

COMPOSITION, SILICONE POLYETHER SURFACTANT FORMED THEREFROM, AND RELATED METHODS AND ARTICLES

CROSS-REFERENCE TO RELATED APPLICATIONS

This application is the U.S. National Stage of International Application No. PCT/US2021/038831 filed on 24 Jun. 2021, which claims priority to and all advantages of U.S. Provisional Patent Application No. 63/043,295 filed on 24 Jun. 2020, the content of which is incorporated herein by reference.

TECHNICAL FIELD

The subject disclosure generally relates to a composition and, more specifically, to a composition for preparing a silicone polyether surfactant. The silicone polyether surfactant and various uses therefore are also disclosed.

BACKGROUND

Silicones are polymeric materials used in numerous commercial applications, primarily due to significant advantages they possess over their carbon-based analogues. More precisely called polymerized siloxanes or polysiloxanes, silicones have an inorganic silicon-oxygen backbone chain (···—Si—O—Si—O—Si—O—···) with organic side groups attached to the silicon atoms.

Some silicones are polyether modified silicones, which may also be referred to as silicone polyethers (SPEs). Numerous SPEs are commercially available for reducing the surface tension of aqueous solutions/dispersions. However, conventional SPEs may suffer from one or more problems.

Foams are known in the art and utilized in various end use applications, including cushions, support articles, encapsulants/pottants, and insulation. Foams can be formed from various chemical compositions, and may utilize physical and/or chemical blowing agents. For example, polyurethane foams are generally formed from reacting an isocyanate and a polyol in the presence of a blowing agent. Oftentimes, foams are formed with SPEs to stabilize isocyanate-reactive components including polyol(s) and/or blowing agents and prevent phase separation prior to use.

BRIEF SUMMARY

A composition is disclosed, which comprises (A) an organohydrogensiloxane having the following structure:

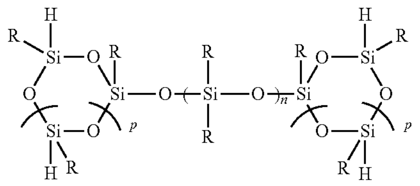

where subscript n is from 1 to 1,000; each subscript p is independently from 1 to 10; and each R is an independently selected substituted or unsubstituted hydrocarbyl group, wherein one or more silicon bonded hydrogen atoms may be replaced with a group having the formula:

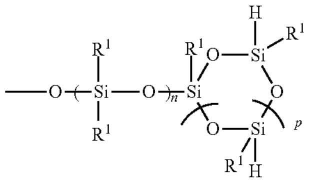

where subscript n is independently selected and defined above, subscript p is independently selected and defined above, and each $R^1$ is an independently selected substituted or unsubstituted hydrocarbyl group. The composition further comprises (B) a polyether compound having an aliphatically unsaturated group; and (C) a hydrosilylation catalyst. A silicone polyether surfactant prepared by reacting components (A) and (B) in the presence of component (C) is also disclosed.

A compound is disclosed which has the following structure:

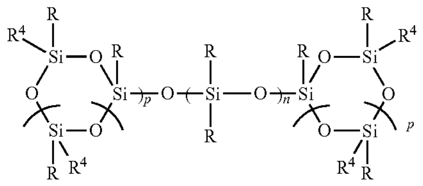

where each $R^4$ is independently selected from a hydrogen atom, a substituted or unsubstituted hydrocarbyl group, a polyether group, or a group of the formula:

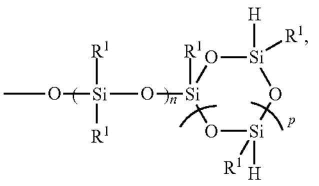

with the proviso that at least one of $R^4$ is the polyether group; each subscript p is independently from 1 to 10; each subscript n is independently from 1 to 2,000; and each R is an independently selected substituted or unsubstituted hydrocarbyl group, and each $R^1$ is independently selected and defined above.

In addition, an isocyanate-reactive component comprising a polyol and the silicone polyether surfactant is disclosed. A composition comprising the isocyanate-reactive component, an isocyanate component comprising a polyisocyanate, and a catalyst is further disclosed. Finally, a method of preparing an article comprising a polyurethane and/or polyisocyanurate foam, and an article formed from the composition and/or the method, are disclosed.

DETAILED DESCRIPTION OF THE INVENTION

A composition is disclosed. The composition is a hydrosilylation-curable composition which can be cured to give a reaction product, which can be referred to as a silicone polyether surfactant, and which is described in greater detail below. The composition comprises (A) an organohydrogensiloxane having the following structure:

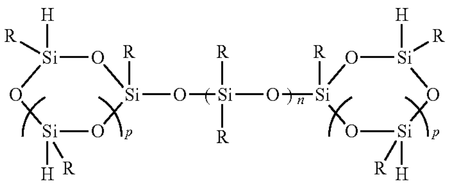

where subscript n is from 1 to 1,000; each subscript p is independently from 1 to 10; and each R is an independently selected substituted or unsubstituted hydrocarbyl group, wherein one or more silicon bonded hydrogen atoms may be replaced with a group having the formula:

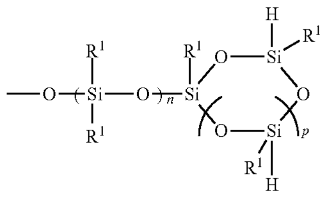

where subscript n is independently selected and defined above, subscript p is independently selected and defined above, and each $R^1$ is an independently selected substituted or unsubstituted hydrocarbyl group.

In general, hydrocarbyl groups suitable for R (and $R^1$) may independently be linear, branched, cyclic, or combinations thereof. Cyclic hydrocarbyl groups encompass aryl groups as well as saturated or non-conjugated cyclic groups. Cyclic hydrocarbyl groups may independently be monocyclic or polycyclic. Linear and branched hydrocarbyl groups may independently be saturated or unsaturated. One example of a combination of a linear and cyclic hydrocarbyl group is an aralkyl group. General examples of hydrocarbyl groups include alkyl groups, aryl groups, alkenyl groups, halocarbon groups, and the like, as well as derivatives, modifications, and combinations thereof. Examples of suitable alkyl groups include methyl, ethyl, propyl (e.g. isopropyl and/or n-propyl), butyl (e.g. isobutyl, n-butyl, tert-butyl, and/or sec-butyl), pentyl (e.g. isopentyl, neopentyl, and/or tert-pentyl), hexyl, hexadecyl, octadecyl, as well as branched saturated hydrocarbon groups having from 6 to 18 carbon atoms. Examples of suitable non-conjugated cyclic groups include cyclobutyl, cyclohexyl, and cycyloheptyl groups. Examples of suitable aryl groups include phenyl, tolyl, xylyl, naphthyl, benzyl, and dimethyl phenyl. Examples of suitable alkenyl groups include vinyl, allyl, propenyl, isopropenyl, butenyl, isobutenyl, pentenyl, heptenyl, hexenyl, hexadecenyl, octadecenyl and cyclohexenyl groups. Examples of suitable monovalent halogenated hydrocarbon groups (i.e., halocarbon groups, or substituted hydrocarbon groups) include halogenated alkyl groups, aryl groups, and combinations thereof. Examples of halogenated alkyl groups include the alkyl groups described above where one or more hydrogen atoms is replaced with a halogen atom such as F or Cl. Specific examples of halogenated alkyl groups include fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl groups, as well as derivatives thereof. Examples of halogenated aryl groups include the aryl groups described above where one or more hydrogen atoms is replaced with a halogen atom, such as F or Cl. Specific examples of halogenated aryl groups include chlorobenzyl and fluorobenzyl groups.

In certain embodiments, not more than three, alternatively not more than two, alternatively not more than one, of H is replaced with the group immediately above including a cyclic siloxane moiety. In one specific embodiment, one such group is present in place of one silicon bonded hydrogen atom in each cyclic siloxane moiety of component (A).

In specific embodiments, each R is an unsubstituted hydrocarbyl group, and component (A) includes only two cyclic siloxane moieties. In these embodiments, the formula of component (A) is:

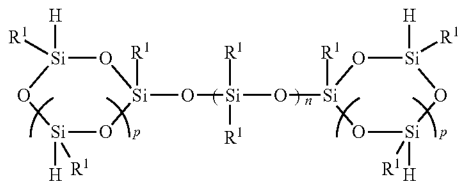

Where $R^1$ and subscripts p and n are defined above. In further embodiments, each R and $R^1$ is free of aliphatic unsaturation (i.e., aliphatic carbon-carbon double or triple bonds). Aliphatic unsaturation does not encompass aromatic unsaturation. In various embodiments, each R and $R^1$ is selected from alkyl groups having from 1 to 32, alternatively from 1 to 28, alternatively from 1 to 24, alternatively from 1 to 20, alternatively from 1 to 16, alternatively from 1 to 12, alternatively from 1 to 8, alternatively from 1 to 4, alternatively 1, carbon atoms.

Subscript n is from 1 to 2,000; alternatively 2 to 2,000; alternatively 1 to 1,000, alternatively from 1 to 900, alternatively from 1 to 800, alternatively from 1 to 700, alternatively from 1 to 600, alternatively from 1 to 500, alternatively from 1 to 400, alternatively from 1 to 300, alternatively from 1 to 200. In other embodiments, subscript n is from 2 to 1,000, alternatively from 2 to 900, alternatively from 2 to 800, alternatively from 2 to 700, alternatively from 2 to 600, alternatively from 2 to 500, alternatively from 2 to 400, alternatively from 2 to 300, alternatively from 2 to 200.

Each subscript p is independently selected and defines the number of Si—O moieties in each cyclic siloxane moiety of the (A) organohydrogensiloxane. Each subscript p is from 1 to 10. As such, each cyclic siloxane moiety of the (A) organohydrogensiloxane independently has from 3 to 12 siloxy units. In certain embodiments, each subscript p is the same. In other embodiments, each subscript p is different. In specific embodiments, each subscript p is independently from 1 to 10, alternatively 1 to 9, alternatively from 1 to 8, alternatively from 1 to 7, alternatively from 1 to 6, alternatively from 1 to 5, alternatively from 1 to 4.

The (A) organohydrogensiloxane may be prepared via different techniques. For example, the (A) organohydrogensiloxane can be synthesized by:

1) combining starting materials comprising i) a boron containing Lewis acid;

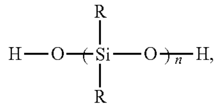

ii) a hydroxyl-functional organosilicon compound of formula where each subscript n is 1 to 2,000, alternatively 2 to 2,000, and each R is independently selected and defined above; and iii) a cyclic polyorganohydrogensiloxane of formula $(RHSiO_{2/2})_v$, where subscript v is 3 to 12; and each R is independently selected and defined above.

Starting material i) in the method of preparing component (A) is a boron containing Lewis acid. The boron containing Lewis acid may be a trivalent boron compound with at least one perfluoroaryl group per molecule, alternatively 1 to 3 perfluoroaryl groups per molecule, alternatively 2 to 3 perfluoroaryl groups per molecule, and alternatively 3 perfluoroaryl groups per molecule. The perfluoroaryl groups may have 6 to 12 carbon atoms, alternatively 6 to 10 carbon atoms, and alternatively 6 carbon atoms. The boron containing Lewis Acid may be selected from the group consisting of $(C_5F_4)(C_6F_5)_2B$; $(C_5F_4)_3B$; $(C_6F_5)BF_2$; $BF(C_6F_5)_2$; $B(C_6F_5)_3$; $BCl_2(C_6F_5)$; $BCl(C_6F_5)_2$; $B(C_6H_5)(C_6F_5)_2$; $B(C_6H_5)_2(C_6F_5)$; $[C_6H_4(mCF_3)]_3B$; $[C_6H_4(pOCF_3)]_3B$; $(C_6F_5)B(OH)_2$; $(C_6F_5)_2BOH$; $(C_6F_5)_2BH$; $(C_6F_5)BH_2$; $(C_7H_{11})B(C_6F_5)_2$; $(C_8H_{14})B(C_6F_5)$; $(C_6F_5)_2B(OC_2H_5)$; or $(C_6F_5)_2B—CH_2CH_2Si(CH_3)$. Alternatively, the boron containing Lewis acid may be tris(pentafluorophenyl)borane of formula $B(C_6F_5)_3$. Such boron containing Lewis acids are commercially available from, e.g., Millipore Sigma of St. Louis, Missouri, USA.

Alternatively the boron containing Lewis acid may have formula:

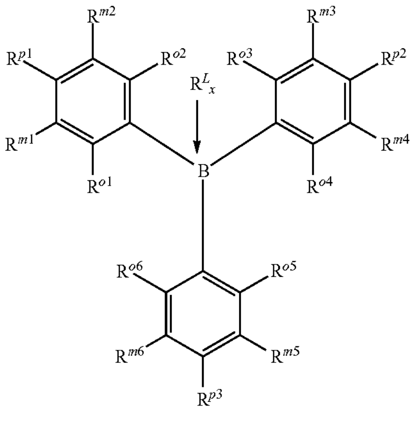

where each $R^o$ is an ortho substituent, each $R^m$ is a meta substituent, and each $R^p$ is a para substituent, $R^L$ is optional and includes a functional group or a functional polymer group; and subscript x is 0 or 1. In the formula above, each of $R^{o1-6}$, each of $R^{m1-6}$, and each of $R^{p1-3}$ is independently selected from H, F, or $CF_3$; with the provisos that: not all of $R^{o1-6}$, $R^{m1-6}$, and $R^{p1-3}$ can be H simultaneously, and when two or more of $R^{o1-4}$ are $CF_3$, then $R^{o5}$ and $R^{o6}$ are each independently selected from H or F. $R^L$ is optional, i.e., $R^L$ is present when subscript x=1 and $R^L$ is absent when subscript x=0. $R^L$ may be a Lewis base that forms a complex with the boron containing Lewis acid of the formula shown above and/or a molecule or moiety that contains at least one electron pair that is available to form a dative bond with the Lewis acid, and may be as described for $R^4$ in WO2019/055740 at paragraphs [0024] to [0025]. Examples of $R^L$ include cyclic ethers such as tetrahydrofuran or tetrahydropyran. Alternatively, $R^L$ may be tetrahydrofuran (THF).

Alternatively, each of $R^{o1}$, $R^{o2}$, $R^{o3}$, $R^{o4}$, $R^{o5}$, and $R^{o6}$ may be H. Alternatively, each of $R^{o1}$, $R^{o2}$, $R^{o3}$, and $R^{o4}$ may be H. Alternatively, each of $R^{o5}$ and $R^{o6}$ may be F.

Alternatively, each of $R^{m1}$, $R^{m2}$, $R^{m3}$, $R^{m4}$, $R^{m5}$, and $R^{m6}$ may be $CF_3$. Alternatively, each of $R^{m1}$, $R^{m2}$, $R^{m3}$, and $R^{m4}$ may be $CF_3$. Alternatively, each of $R^{m5}$ and $R^{m6}$ may be F. Alternatively, each of $R^{m5}$ and $R^{m6}$ may be H.

Alternatively, each of $R^{p1}$, $R^{p2}$, and $R^{p3}$ may be H. Alternatively, $R^{p1}$ and $R^{p2}$ may be H. Alternatively, $R^{p3}$ may be F. Alternatively, $R^{p3}$ may be $CF_3$.

Alternatively, each of $R^{o1}$, $R^{o2}$, $R^{o3}$, $R^{o4}$, $R^{o5}$, $R^{o6}$, $R^{p1}$, $R^{p2}$, and $R^{p3}$ may be H; and each of $R^{m1}$, $R^{m2}$, $R^{m3}$, $R^{m4}$, $R^{m5}$, and $R^{m6}$ may be $CF_3$. Subscript x may be 1. Alternatively, starting material i) may comprise tris(3,5-bis(trifluoromethyl)phenyl)borane THF adduct.

Alternatively, each of $R^{o1}$, $R^{o2}$, $R^{o3}$, $R^{o4}$, $R^{o5}$, $R^{o6}$, $R^{m5}$, $R^{m6}$, $R^{p1}$, $R^{p2}$, may be H; and each of $R^{m1}$, $R^{m2}$, $R^{m3}$, $R^{m4}$, and $R^{p3}$ may be $CF_3$. Subscript x may be 1. Alternatively, starting material i) may comprise bis(3,5-bis(trifluoromethyl)phenyl)(4-trifluoromethylphenyl)borane THF adduct.

Alternatively, each of $R^{o1}$, $R^{o2}$, $R^{o3}$, $R^{o4}$, $R^{m5}$, $R^{m6}$, $R^{p1}$, and $R^{p2}$ may be H; each of $R^{o5}$, $R^{o6}$, and $R^{p3}$ may be F; and each of $R^{m1}$, $R^{m2}$, $R^{m3}$, $R^{m4}$, may be $CF_3$. Subscript x may be 1. Alternatively, starting material i) may comprise bis(3,5-bis(trifluoromethyl)phenyl)(2,4,6-trifluorophenyl)borane THF adduct.

Alternatively, each of $R^{o1}$, $R^{o2}$, $R^{o3}$, $R^{o4}$, $R^{m5}$, $R^{m6}$, $R^{p1}$, $R^{p2}$, and $R^{p3}$ may be H; $R^{o5}$ and $R^{o6}$ may be F; and each of $R^{m1}$, $R^{m2}$, $R^{m3}$, and $R^{m4}$ may be $CF_3$. Subscript x may be 1. Alternatively, starting material i) may comprise bis(3,5-bis(trifluoromethyl)phenyl)(2,6-difluorophenyl)borane THF adduct.

Alternatively, each of $R^{o1}$, $R^{o2}$, $R^{o3}$, $R^{o4}$, $R^{o5}$, $R^{m6}$, $R^{p1}$, $R^{p2}$, and $R^{p3}$ may be H; and each of $R^{m1}$, $R^{m2}$, $R^{m3}$, $R^{m4}$, $R^{m5}$, and $R^{o6}$ may be $CF_3$. Subscript x may be 0. Alternatively, starting material i) may comprise bis(3,5-bis(trifluoromethyl)phenyl)(2,5-bis(trifluoromethyl)phenyl)borane.

Alternatively, each of $R^{m1}$, $R^{p1}$, $R^{o2}$, $R^{o3}$, $R^{o4}$, $R^{p2}$, $R^{p3}$, $R^{o5}$, and $R^{m6}$ may be H; and each of $R^{o1}$, $R^{m2}$, $R^{m3}$, $R^{m4}$, $R^{o6}$, and $R^{m5}$ may be $CF_3$. Subscript x may be 0. Alternatively, starting material i) may comprise (3,5-bis(trifluoromethyl)phenyl)bis(2,5-bis(trifluoromethyl)phenyl)borane.

Alternatively, each of $R^{o1}$, $R^{o2}$, $R^{o3}$, $R^{o4}$, $R^{p1}$, and $R^{p2}$ may be H; each of $R^{o5}$, $R^{o6}$, $R^{m5}$, and $R^{m6}$ may be F; and each of $R^{m1}$, $R^{m2}$, $R^{m3}$, $R^{m4}$, and $R^{p3}$ may be $CF_3$. Subscript x may be 1. Alternatively, starting material i) may comprise bis(3,5-bis(trifluoromethyl)phenyl)(2,3,5,6-tetrafluoro-4-trifluoromethylphenyl)borane THF adduct.

Boron containing Lewis acid suitable for starting material i) are known in the art, and may be prepared by known methods, for example, the methods disclosed in WO2019/055740, particularly at paragraphs [0052] to [0096] by varying appropriate starting materials.

The amount of starting material i) will depend on the type and amount of other starting materials used, however, starting material i) may be present in an amount of 50 ppm to 6000 ppm based on combined weights of starting materials i), ii) and iii). Alternatively, the amount may be 50 ppm to 600 ppm on the same basis.

Starting material ii) in the method of preparing component (A) is a hydroxyl-functional organosilicon compound of formula:

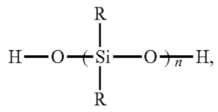

where each subscript n is 1 to 2,000, and each R is independently selected and defined above. Alternatively, subscript n may have a value such that $2 \le n \le 2{,}000$, alternatively $2 \le n \le 1{,}000$, alternatively $5 \le n \le 900$, alternatively $5 \le n \le 50$, and alternatively $5 \le n \le 15$. When subscript n=1, starting material B) may be a hydroxyl-functional silane, such as dimethyldisilanol. Hydroxyl-functional silanes are commercially available.

Alternatively, when subscript $n \ge 2$, then starting material ii) may be a hydroxyl-terminated polydiorganosiloxane. Hydroxyl-terminated polydiorganosiloxanes suitable for use as starting material ii) may be prepared by methods known in the art, such as hydrolysis and condensation of the corresponding organohalosilanes or equilibration of cyclic polydiorganosiloxanes. Exemplary hydroxyl-terminated polydiorganosiloxanes are hydroxyl terminated polydimethylsiloxanes. Suitable hydroxyl terminated polydimethylsiloxanes are also commercially available, e.g., from Gelest, Inc. of Morrisville, Pennsylvania, USA, such as DMS-S12, DMS-S14, DMS-S15, DMS-S21, DMS-S27, DMS-S41, DMS-S32, DMS-S33, DMS-S35, DMS-S42, and DMS-S45.

Starting material iii) for the method in the method of preparing component (A) is a cyclic polyorganohydrogensiloxane of formula: $(RHSiO_{2/2})v$, where subscript v is 3 to 12, and each R is an independently selected monovalent hydrocarbon group. Alternatively, subscript v may be 4 to 10, alternatively 4 to 8. Alternatively, subscript v may have an average value of 4 to 6, alternatively 4 to 5, and alternatively 4. Suitable cyclic polyorganohydrogensiloxanes are known in the art and are commercially available, e.g., from Dow Silicones Corporation of Midland, Michigan, USA.

The amounts of starting materials ii) and iii) depend on various factors including the OH content of ii) the hydroxyl-functional organosilicon compound and the silicon bonded hydrogen (SiH) content of iii) the cyclic polyorganohydrogensiloxane. However, amounts are sufficient to provide a molar ratio of SiH in starting material iii) to OH in starting material ii) (SiH:OH ratio) of 4:1 to 40:1, alternatively 5:1 to 20:1, and alternatively 5:1 to 10:1.A solvent may be used in the method.

The composition further comprises (B) a polyether compound having an aliphatically unsaturated group. Typically, the aliphatically unsaturated group is terminal in the (B) polyether compound.

In certain embodiments, the (B) polyether compound has the formula $R^2O(C_mH_{2m}O)_qR^3$, wherein $R^2$ is an aliphatically unsaturated group, subscript m is independently selected from 2 to 4 in each moiety indicated by subscript q; subscript q is from 1 to 200; and $R^3$ is selected from $R^1$, H, and $—C(O)R^1$, where $R^1$ is independently selected and defined above.

In specific embodiments, the (B) polyether compound has the formula $R^2O(C_2H_4O)_x(C_3H_6O)_y(C_4H_8O)_zR^3$, wherein $R^2$ is an aliphatically unsaturated group; $0 \le x \le 200$; $0 \le y \le 200$; and $0 \le z \le 200$; with the provisos that subscripts x, y and z are not simultaneously 0 and units indicated by subscripts x, y and z may be in randomized or block form in the (B) polyether compound; and $R^3$ is selected from $R^1$, H, and $—C(O)R^1$, where $R^1$ is independently selected and defined above. As understood in the art, moieties indicated by subscript x are ethylene oxide (EO) units, moieties indicated by subscript y are propylene oxide (PO) units, and moieties indicated by subscript z are butylene oxide (BO) units. The EO, PO, and BO units, if present, may be in block or randomized form in the (B) polyether compound. The relative amounts of EO, PO, and BO units, if present, can be selectively controlled based on desired properties of the reaction product of the composition. For example, the molar ratios of such alkylene oxide units can influence hydrophilicity and other properties.

The oxyalkylene units in the (B) polyether compound may independently be linear or branched. For example, oxyethylene units, if present, may be of formula $—CH_2CH_2O—$ or of formula $—CHCH_3O—$. Similarly, oxypropylene units, if present, may be of formula $—CH_2CH_2CH_2O—$, of formula $—CH_2CHCH_3O—$, or of formula $—CHCH_3CH_2O—$.

It is to be appreciated that the (B) polyether compound can have one or more moieties selected from the group of EO, PO, and BO, either alone, or in combination. For example, the (B) polyether compound can have just $[EO]_x$ moieties, just $[PO]_y$ moieties or just $[BO]_z$ moieties, or combinations of these moieties such as $[EO]_x[PO]_y$ moieties, $[EO]_x[BO]_z$ moieties, $[PO]_y[BO]_z$ moieties, or $[EO]_x[PO]_y[BO]_z$ moieties. As introduced above, units indicated by subscripts x, y and z may be in randomized or block form in the (B) polyether compound. In addition, units indicated by subscripts x, y and z need not be in the order specifically illustrated herein. For example, one of skill in the art appreciates that polymerization mixtures of two or more alkylene oxides (AOs) can be used to form randomized polyethers, and order of addition and/or timing thereof of two or more AOs during polymerization reaction can be used to form block polyethers, have different orders of AOs and chain lengths thereof, or combinations of randomized and block polyethers can be formed.

In certain embodiments, subscript x is from (and including) 1 to 200, alternatively from 1 to 50, alternatively from 2 to 40, alternatively from 3 to 30, alternatively from 4 to 25, alternatively from 5 to 20. In further embodiments, subscript x is from (and including) 10 to 20, alternatively from 12 to 18, alternatively from 14 to 16, alternatively is 16. In further embodiments, subscript x is from (and including) 20 to 30, alternatively from 22 to 28, alternatively from 24 to 26, alternatively is 24 or 26. In yet other embodiments, subscript x is from (and including) 30 to 40, alternatively from 32 to 38, alternatively from 34 to 36.

In certain embodiments, subscript y is from (and including) 0 to 50, alternatively from 1 to 50, alternatively from 0 to 40, alternatively from 1 to 40, alternatively from 0 to 30, alternatively from 1 to 30, alternatively from 0 to 25, alternatively from 1 to 25, alternatively from 0 to 20, alternatively from 1 to 20. In further embodiments, subscript y is from (and including) 10 to 20, alternatively from 12 to 18, alternatively from 14 to 16, alternatively is 16. In further embodiments, subscript y is from (and including) 20 to 30, alternatively from 22 to 28, alternatively from 24 to 26, alternatively is 24 or 26. In yet other embodiments, subscript y is from (and including) 30 to 40, alternatively from 32 to 38, alternatively from 34 to 36.

In certain embodiments, subscript z is from (and including) 0 to 50, alternatively from 1 to 50, alternatively from 0 to 40, alternatively from 1 to 40, alternatively from 0 to 30, alternatively from 1 to 30, alternatively from 0 to 25, alternatively from 1 to 25, alternatively from 0 to 20, alternatively from 1 to 20. In further embodiments, subscript z is from (and including) 10 to 20, alternatively from 12 to 18, alternatively from 14 to 16, alternatively is 16. In further embodiments, subscript z is from (and including) 20 to 30, alternatively from 22 to 28, alternatively from 24 to 26, alternatively is 24 or 26. In yet other embodiments, subscript z is from (and including) 30 to 40, alternatively from 32 to 38, alternatively from 34 to 36.

$R^3$ is selected from $R^1$, H, and —C(O)$R^1$, where $R^1$ is independently selected and defined above. In certain embodiments, $R^3$ is selected from substituted or unsubstituted hydrocarbyl groups, which are disclosed above for R, e.g. $R^3$ is an alkyl group. In certain embodiments, $R^3$ is an alkyl group having from 1 to 18, alternatively from 1 to 16, alternatively from 1 to 14, alternatively from 1 to 12, alternatively from 1 to 10, alternatively from 1 to 8, alternatively from 1 to 6, alternatively from 1 to 4, alternatively from 1 to 3, alternatively from 1 to 2, alternatively 1, carbon atom(s). In specific embodiments, $R^3$ is a methyl group. In other embodiments, $R^3$ is H. In yet other embodiments, $R^3$ is —C(O)$R^1$. When $R^3$ is —C(O)$R^1$, $R^1$ is typically an alkyl group having from 1 to 18, alternatively from 1 to 16, alternatively from 1 to 14, alternatively from 1 to 12, alternatively from 1 to 10, alternatively from 1 to 8, alternatively from 1 to 6, alternatively from 1 to 4, alternatively from 1 to 3, alternatively from 1 to 2, alternatively 1, carbon atom(s), e.g. $R^3$ is an acyl group.

$R^2$ is an aliphatically unsaturated group, which is typically an alkenyl and/or alkynyl group having from 2 to 18, alternatively from 2 to 16, alternatively from 2 to 14, alternatively from 2 to 12, alternatively from 2 to 8, alternatively from 2 to 4, alternatively 2, carbon atoms. "Alkenyl" means an acyclic, branched or unbranched, monovalent hydrocarbon group having one or more carbon-carbon double bonds. Specific examples thereof include vinyl groups, allyl groups, hexenyl groups, and octenyl groups. "Alkynyl" means an acyclic, branched or unbranched, monovalent hydrocarbon group having one or more carbon-carbon triple bonds. Specific examples thereof include ethynyl, propynyl, and butynyl groups. Various examples of ethylenically unsaturated groups include $CH_2{=}CH{-}$, $CH_2{=}CHCH_2{-}$, $CH_2{=}CH(CH_2)_4{-}$, $CH_2{=}CH(CH_2)_6{-}$, $CH_2{=}C(CH_3)CH_2{-}$, $H_2C{=}C(CH_2){-}$, $H_2C{=}C(CH_3){-}$, $H_2C{=}C(CH_3)CH_2{-}$, $H_2C{=}CHCH_2CH_2{-}$, $H_2C{=}CHCH_2CH_2CH_2{-}$, $HC{\equiv}C{-}$, $HC{\equiv}CCH_2{-}$, $HC{\equiv}CCH(CH_2){-}$, $HC{\equiv}CC(CH_3)_2{-}$, and $HC{\equiv}CC(CH_3)_2CH_2{-}$. Typically, ethylenic unsaturation is terminal in $R^2$. As understood in the art, ethylenic unsaturation may be referred to as aliphatic unsaturation.

The relative amounts of components (A) and (B) in the composition are a function of the desired reaction product. For example, the value of each subscript p generally dictates the number of silicon-bonded hydrogen atoms in component (A), and if no silicon-bonded hydrogen atoms are desired in the reaction product, a molar excess of component (B) can be utilized relative to the moles of silicon-bonded hydrogen atoms in component (A). Alternatively, residual silicon-bonded hydrogen atoms may be desired, or further components comprising ethylenic unsaturation may be utilized to consume silicon-bonded hydrogen atoms of component (A) without imparting polyether functionality in the reaction product. One of skill in the art readily understands how to determine the desired content of components (A) and (B) in the composition. Component (A) can optionally comprise a blend of different compounds, e.g. having different value of subscripts p and/or n, and component (B) can optionally comprise a blend of different polyether compounds.

The composition further comprises (C) a hydrosilylation catalyst. The (C) hydrosilylation catalyst is not limited and may be any known hydrosilylation-reaction catalyst for catalyzing hydrosilylation reactions. Combinations of different hydrosilylation catalysts may be utilized.

In certain embodiments, the (C) hydrosilylation catalyst comprises a Group VIII to Group XI transition metal. Group VIII to Group XI transition metals refer to the modern IUPAC nomenclature. Group VIII transition metals are iron (Fe), ruthenium (Ru), osmium (Os), and hassium (Hs); Group IX transition metals are cobalt (Co), rhodium (Rh), and iridium (Ir); Group X transition metals are nickel (Ni), palladium (Pd), and platinum (Pt); and Group XI transition metals are copper (Cu), silver (Ag), and gold (Au). Combinations thereof, complexes thereof (e.g. organometallic complexes), and other forms of such metals may be utilized as the (C) hydrosilylation catalyst.

Additional examples of catalysts suitable for the (C) hydrosilylation catalyst include rhenium (Re), molybdenum (Mo), Group IV transition metals (i.e., titanium (Ti), zirconium (Zr), and/or hafnium (Hf)), lanthanides, actinides, and Group I and II metal complexes (e.g. those comprising calcium (Ca), potassium (K), strontium (Sr), etc.). Combinations thereof, complexes thereof (e.g. organometallic complexes), and other forms of such metals may be utilized as the (C) hydrosilylation catalyst.

The (C) hydrosilylation catalyst may be in any suitable form. For example, the (C) hydrosilylation catalyst may be a solid, examples of which include platinum-based catalysts, palladium-based catalysts, and similar noble metal-based catalysts, and also nickel-based catalysts. Specific examples thereof include nickel, palladium, platinum, rhodium, cobalt, and similar elements, and also platinum-palladium, nickel-copper-chromium, nickel-copper-zinc, nickel-tungsten, nickel-molybdenum, and similar catalysts comprising combinations of a plurality of metals. Additional examples of solid catalysts include Cu—Cr, Cu—Zn, Cu—Si, Cu—Fe—Al, Cu—Zn—Ti, and similar copper-containing catalysts, and the like.

The (C) hydrosilylation catalyst may be in or on a solid carrier. Examples of carriers include activated carbons, silicas, silica aluminas, aluminas, zeolites and other inorganic powders/particles (e.g. sodium sulphate), and the like. The (C) hydrosilylation catalyst may also be disposed in a vehicle, e.g. a solvent which solubilizes the hydrosilylation-reaction catalyst, alternatively a vehicle which merely carries, but does not solubilize, the (C) hydrosilylation catalyst. Such vehicles are known in the art.

In specific embodiments, the (C) hydrosilylation catalyst comprises platinum. In these embodiments, the (C) hydrosilylation catalyst is exemplified by, for example, platinum black, compounds such as chloroplatinic acid, chloroplatinic acid hexahydrate, a reaction product of chloroplatinic acid and a monohydric alcohol, platinum bis(ethylacetoacetate), platinum bis(acetylacetonate), platinum chloride, and complexes of such compounds with olefins or organopolysiloxanes, as well as platinum compounds microencapsulated in a matrix or core-shell type compounds. Microencapsulated hydrosilylation catalysts and methods of their preparation are also known in the art, as exemplified in U.S. Pat.

Nos. 4,766,176 and 5,017,654, which are incorporated by reference herein in their entireties.

Complexes of platinum with organopolysiloxanes suitable for use as the (C) hydrosilylation catalyst include 1,3-diethenyl-1,1,3,3-tetramethyldisiloxane complexes with platinum. These complexes may be microencapsulated in a resin matrix. Alternatively, the (C) hydrosilylation catalyst may comprise 1,3-diethenyl-1,1,3,3-tetramethyldisiloxane complex with platinum. The hydrosilylation-reaction catalyst may be prepared by a method comprising reacting chloroplatinic acid with an aliphatically unsaturated organosilicon compound such as divinyltetramethyldisiloxane, or alkene-platinum-silyl complexes. Alkene-platinum-silyl complexes may be prepared, for example by mixing 0.015 mole (COD)$PtCl_2$ with 0.045 mole COD and 0.0612 moles $HMeSiCl_2$, where COD represents cyclooctadiene.

Additional examples of suitable hydrosilylation catalysts for component (C) are described in, for example, U.S. Pat. Nos. 3,159,601; 3,220,972; 3,296,291; 3,419,593; 3,516,946; 3,814,730; 3,989,668; 4,784,879; 5,036,117; and 5,175,325; the disclosures of which are incorporated herein by reference in their entireties.

The (C) hydrosilylation catalyst may also comprise, or alternatively be, a photoactivatable hydrosilylation catalyst, which may initiate curing via irradiation and/or heat. The photoactivatable hydrosilylation catalyst can be any hydrosilylation catalyst capable of catalyzing the hydrosilylation reaction, particularly upon exposure to radiation having a wavelength of from 150 to 800 nanometers (nm).

Specific examples of photoactivatable hydrosilylation-reaction catalysts suitable for the (C) hydrosilylation catalyst include, but are not limited to, platinum(II) β-diketonate complexes, such as platinum(II) bis(2,4-pentanedioate), platinum(II) bis(2,4-hexanedioate), platinum(II) bis(2,4-heptanedioate), platinum(II) bis(1-phenyl-1,3-butanedioate, platinum(II) bis(1,3-diphenyl-1,3-propanedioate), platinum (II) bis(1,1,1,5,5,5-hexafluoro-2,4-pentanedioate); (η-cyclopentadienyl)trialkylplatinum complexes, such as (Cp)trimethylplatinum, (Cp)ethyldimethylplatinum, (Cp) triethylplatinum, (chloro-Cp)trimethylplatinum, and (trimethylsilyl-Cp)trimethylplatinum, where Cp represents cyclopentadienyl; triazene oxide-transition metal complexes, such as $Pt[C_6H_5NNNOCH_3]_4$, $Pt[p\text{-}CN—C_6H_4NNNOC_6H_{11}]_4$, $Pt[p\text{-}H_3COC_6H_4NNNOC_6H_{11}]_4$, $Pt[p\text{-}CH_3(CH_2)_x—C_6H_4NNNOCH_3]_4$, 1,5-cyclooctadiene. $Pt[p\text{-}CN—C_6H_4NNNOC_6H_{11}]_2$, 1,5-cyclooctadiene. $Pt[p\text{-}CH_3O—C_6H_4NNNOCH_3]_2$, $[(C_6H_5)_3P]_3Rh[p\text{-}CN—C_6H_4NNNOC_6H_{11}]$, and $Pd[p\text{-}CH_3(CH_2)_x—C_6H_4NNNOCH_3]_2$, where x is 1, 3, 5, 11, or 17; (η-diolefin) (σ-aryl)platinum complexes, such as ($η^4$-1,5-cyclooctadienyl)diphenylplatinum, $η^4$-1,3,5,7-cyclooctatetraenyl)diphenylplatinum, ($η^4$-2,5-norboradienyl)diphenylplatinum, ($η^4$-1,5-cyclooctadienyl)bis-(4-dimethylaminophenyl)platinum, ($η^4$-1,5-cyclooctadienyl)bis-(4-acetylphenyl)platinum, and ($η^4$-1,5-cyclooctadienyl)bis-(4-trifluormethylphenyl)platinum.

The present disclosure also provides a compound which has the following structure:

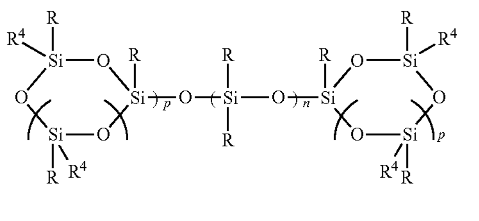

where each $R^4$ is independently selected from a hydrogen atom, a substituted or unsubstituted hydrocarbyl group, a polyether group, or a group of the formula

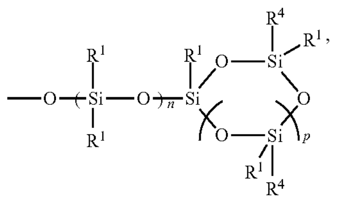

with the proviso that at least one of $R^4$ is the polyether group; each subscript p is independently from 1 to 10; each subscript n is independently from 1 to 2,000; each R is an independently selected substituted or unsubstituted hydrocarbyl group, and each $R^1$ is an independently selected substituted or unsubstituted hydrocarbyl group. In certain embodiments, the compound is prepared by reacting components (A) and (B) in the presence of component (C) of the composition.

In certain embodiments, not more than three, alternatively not more than two, alternatively not more than one, of $R^4$ is the group immediately above including a cyclic siloxane moiety. In one specific embodiment, the compound includes as $R^4$ one such group in each cyclic siloxane moiety.

In other embodiments, the compound has the following structure:

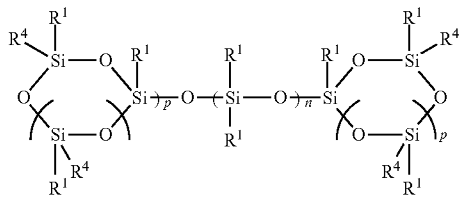

where $R^1$, $R^4$, and subscripts p and n are each defined above.

When the compound is formed from the composition, i.e., via hydrosilylation of components (A) and (B) in the presence of component (C), the polyether group for $R^4$ is formed by hydrosilylation of the silicon-bonded hydrogen atoms of component (A). Each $R^4$ that is a polyether group is formed from hydrosilylating the (B) polyether compound with the particular silicon-bonded hydrogen atom of component (A). However, $R^4$ can be an unreacted hydrogen or a hydrocarbyl group other than the polyether group. When the compound includes two or more polyether groups represented by $R^4$, the polyether groups are independently selected and can be the same as or different from one another. When $R^4$ is a hydrocarbyl group other than the polyether group, $R^4$ can be formed from hydrosilylation of any unsaturated compound with the particular silicon-bonded hydrogen atom of component (A), e.g. an alkene, a diene, an alkyne, and/or functionalized or substituted forms thereof. In certain embodiments, at least 10, alternatively at least 20, alternatively at least 30, alternatively at least 40, alternatively at least 50, alternatively at least 60, alternatively at least 70, alternatively at least 80, alternatively at least 90, alternatively 100, mole percent of $R^4$ groups in the compound are polyether groups.

In certain embodiments, the polyether group of $R^4$ has the formula $\text{-D-O}(C_mH_{2m}O)_qR^3$, wherein D is a divalent linking group, subscript m is independently selected from 2 to 4 in each moiety indicated by subscript q; subscript q is from 1 to 200; and $R^3$ is selected from $R^1$, H, and —C(O)$R^1$, where $R^1$ is independently selected and defined above. D is generally a divalent hydrocarbon group formed from hydrosilylation of $R^2$ in the (B) polyether compound, which results in the polyether group of $R^4$. Thus, the structure of D is a function of the ethylenically unsaturated group of the (B) polyether compound. D can be branched or linear, and may still include ethylenic unsaturation when $R^2$ of the (B) polyether group is an alkynyl group. In certain embodiments, D has formula $—C_jH_{2j}—$, where j is from 2 to 18, alternatively from 2 to 16, alternatively from 2 to 14, alternatively from 2 to 12, alternatively from 2 to 10, alternatively from 2 to 8, alternatively from 2 to 6, alternatively from 2 to 4.

In specific embodiments, the polyether group of $R^4$ has the formula $-D-O(C_2H_4O)_x(C_3H_6O)_y(C_4H_8O)_zR^3$, wherein D is a divalent linking group; $0 \le x \le 200$; $0 \le y \le 200$; and $0 \le z \le 200$; with the provisos that subscripts x, y and z are not simultaneously 0 and units indicated by subscripts x, y and z may be in randomized or block form in the (polyether group of $R^4$; and $R^3$ is selected from $R^1$, H, and —C(O)$R^1$, where $R^1$ is independently selected and defined above. The EO, PO, and BO units, if present, may be in block or randomized form in the (B) polyether compound. The relative amounts of EO, PO, and BO units, if present, can be selectively controlled based on desired properties of the compound. D is described above.

The oxyalkylene units in the polyether group of $R^4$ may independently be linear or branched. For example, oxyethylene units, if present, may be of formula $—CH_2CH_2O—$ or of formula $—CHCH_3O—$. Similarly, oxypropylene units, if present, may be of formula $—CH_2CH_2CH_2O—$, of formula $—CH_2CHCH_3O—$, or of formula $—CHCH_3CH_2O—$.

It is to be appreciated that the polyether group of $R^4$ can have one or more moieties selected from the group of EO, PO, and BO, either alone, or in combination. For example, the polyether group of $R^4$ can have just $[EO]_x$ moieties, just $[PO]_y$ moieties or just $[BO]_z$ moieties, or combinations of these moieties such as $[EO]_x[PO]_y$ moieties, $[EO]_x[BO]_z$ moieties, $[PO]_y[BO]_z$ moieties, or $[EO]_x[PO]_y[BO]_z$ moieties. As introduced above, units indicated by subscripts x, y and z may be in randomized or block form in the polyether group of $R^4$. In addition, units indicated by subscripts x, y and z need not be in the order specifically illustrated herein. For example, one of skill in the art appreciates that polymerization mixtures of two or more alkylene oxides (AOs) can be used to form randomized polyethers, and order of addition and/or timing thereof of two or more AOs during polymerization reaction can be used to form block polyethers, have different orders of AOs and chain lengths thereof, or combinations of randomized and block polyethers can be formed.

In certain embodiments, subscript x is from (and including) 1 to 200, alternatively from 1 to 50, alternatively from 2 to 40, alternatively from 3 to 30, alternatively from 4 to 25, alternatively from 5 to 20. In further embodiments, subscript x is from (and including) 10 to 20, alternatively from 12 to 18, alternatively from 14 to 16, alternatively is 16. In further embodiments, subscript x is from (and including) 20 to 30, alternatively from 22 to 28, alternatively from 24 to 26, alternatively is 24 or 26. In yet other embodiments, subscript x is from (and including) 30 to 40, alternatively from 32 to 38, alternatively from 34 to 36.

In certain embodiments, subscript y is from (and including) 0 to 50, alternatively from 1 to 50, alternatively from 0 to 40, alternatively from 1 to 40, alternatively from 0 to 30, alternatively from 1 to 30, alternatively from 0 to 25, alternatively from 1 to 25, alternatively from 0 to 20, alternatively from 1 to 20. In further embodiments, subscript y is from (and including) 10 to 20, alternatively from 12 to 18, alternatively from 14 to 16, alternatively is 16. In further embodiments, subscript y is from (and including) 20 to 30, alternatively from 22 to 28, alternatively from 24 to 26, alternatively is 24 or 26. In yet other embodiments, subscript y is from (and including) 30 to 40, alternatively from 32 to 38, alternatively from 34 to 36.

In certain embodiments, subscript z is from (and including) 0 to 50, alternatively from 1 to 50, alternatively from 0 to 40, alternatively from 1 to 40, alternatively from 0 to 30, alternatively from 1 to 30, alternatively from 0 to 25, alternatively from 1 to 25, alternatively from 0 to 20, alternatively from 1 to 20. In further embodiments, subscript z is from (and including) 10 to 20, alternatively from 12 to 18, alternatively from 14 to 16, alternatively is 16. In further embodiments, subscript z is from (and including) 20 to 30, alternatively from 22 to 28, alternatively from 24 to 26, alternatively is 24 or 26. In yet other embodiments, subscript z is from (and including) 30 to 40, alternatively from 32 to 38, alternatively from 34 to 36.

$R^3$ is selected from $R^1$, H, and —C(O)$R^1$, where $R^1$ is independently selected and defined above. In certain embodiments, $R^3$ is selected from substituted or unsubstituted hydrocarbyl groups, which are disclosed above for R, e.g. $R^3$ cay be an alkyl group. In certain embodiments, $R^3$ is an alkyl group having from 1 to 18, alternatively from 1 to 16, alternatively from 1 to 14, alternatively from 1 to 12, alternatively from 1 to 10, alternatively from 1 to 8, alternatively from 1 to 6, alternatively from 1 to 4, alternatively from 1 to 3, alternatively from 1 to 2, alternatively 1, carbon atom(s). In specific embodiments, $R^3$ is a methyl group. In other embodiments, $R^3$ is H. In yet other embodiments, $R^3$ is —C(O)$R^1$. When $R^3$ is —C(O)$R^1$, $R^1$ is typically an alkyl group having from 1 to 18, alternatively from 1 to 16, alternatively from 1 to 14, alternatively from 1 to 12, alternatively from 1 to 10, alternatively from 1 to 8, alternatively from 1 to 6, alternatively from 1 to 4, alternatively from 1 to 3, alternatively from 1 to 2, alternatively 1, carbon atom(s), e.g. $R^3$ is an acyl group.

Subscript n is from 1 to 1,000, alternatively from 1 to 900, alternatively from 1 to 800, alternatively from 1 to 700, alternatively from 1 to 600, alternatively from 1 to 500, alternatively from 1 to 400, alternatively from 1 to 300, alternatively from 1 to 200. In other embodiments, subscript n is from 2 to 1,000, alternatively from 2 to 900, alternatively from 2 to 800, alternatively from 2 to 700, alternatively from 2 to 600, alternatively from 2 to 500, alternatively from 2 to 400, alternatively from 2 to 300, alternatively from 2 to 200.

Each subscript p is independently selected and defines the number of Si—O moieties in each cyclic siloxane moiety of the compound. Each subscript p is from 1 to 9. As such, each cyclic siloxane moiety of the compound independently has from 3 to 12 siloxy units. In certain embodiments, each subscript p is the same. In other embodiments, each subscript p is different. In specific embodiments, each subscript p is independently from 1 to 9, alternatively from 1 to 8, alternatively from 1 to 7, alternatively from 1 to 6, alternatively from 1 to 5, alternatively from 1 to 4.

The compound described above has excellent physical properties for use as a surfactant. For example, the compound is particularly suited for use as a surfactant in polyurethane and/or polyisocyanurate compositions, as described below. However, the compound is not so limited. For example, the compound can be utilized as a surfactant in cosmetic compositions, coating compositions, textile compositions, lignocellulosic compositions, and any other composition or emulsion that typically utilizes a surfactant.

The present disclosure also provides an isocyanate-reactive component. The isocyanate-reactive component is typically utilized to react with an isocyanate, e.g. in forming a polyurethane and/or polyisocyanurate. The isocyanate-reactive component comprises the compound described above as a surfactant. The isocyanate-reactive component further comprises a polyol.

The isocyanate-reactive component typically comprises the compound in an amount of from greater than 0 to 10, alternatively from 0.1 to 10, alternatively from 0.1 to 9, alternatively from 0.1 to 8, alternatively from 0.1 to 7, alternatively from 0.1 to 6, alternatively from 0.1 to 5, alternatively from 1 to 4, alternatively from 1.5 to 3.5, alternatively from 2 to 3, parts by weight based on 100 parts by weight of the total amount of polyol in the isocyanate-reactive component.

Polyether polyols suitable for the isocyanate-reaction component include, but are not limited to, products obtained by the polymerization of a cyclic oxide, for example, ethylene oxide ("EO"), propylene oxide ("PO"), butylene oxide ("BO"), tetrahydrofuran, or epichlorohydrin, in the presence of polyfunctional initiators. Suitable initiators contain a plurality of active hydrogen atoms. Catalysis for this polymerization can be either anionic or cationic, with suitable catalysts including KOH, CsOH, boron trifluoride, or a double cyanide complex (DMC) catalyst such as zinc hexacyanocobaltate or a quaternary phosphazenium compound. The initiator may be selected from, for example, neopentylglycol; 1,2-propylene glycol; trimethylolpropane; pentaerythritol; sorbitol; sucrose; glycerol; aminoalcohols, such as ethanolamine, diethanolamine, and triethanolamine; alkanediols, such as 1,6-hexanediol, 1,4-butanediol, 1,3-butane diol, 2,3-butanediol, 1,3-propanediol, 1,2-propanediol, 1,5-pentanediol, 2-methylpropane-1,3-diol, 1,4-cyclohexane diol, 1,3-cyclohexanedimethanol, 1,4-cyclohexanedimethanol, 2,5-hexanediol; ethylene glycol; diethylene glycol, triethylene glycol; bis-3-aminopropyl methylamine; ethylene diamine; diethylene triamine; 9(1)-hydroxymethyloctadecanol, 1,4-bishydroxymethylcyclohexane; hydrogenated bisphenol; 9,9(10,10)-bishydroxymethyloctadecanol; 1,2,6-hexanetriol, and combination thereof. Other initiators include other linear and cyclic compounds containing an amine. Exemplary polyamine initiators include ethylene diamine, neopentyldiamine, 1,6-diaminohexane; bisaminomethyltricyclodecane; bisaminocyclohexane; diethylene triamine; bis-3-aminopropyl methylamine; triethylene tetramine; various isomers of toluene diamine; diphenylmethane diamine; N-methyl-1,2-ethanediamine, N-methyl-1,3-propanediamine; N,N-dimethyl-1,3-diaminopropane; N,N-dimethylethanolamine; 3,3'-diamino-N-methyldipropylamine; N,N-dimethyldipropylenetriamine; aminopropyl-imidazole; and combinations thereof. As understood in the art, the initiator compound, or combination thereof, is generally selected based on desired functionality of the resulting polyether polyol. For the purposes of this disclosure, the polyol may be formed with any of the initiators mentioned above, or combinations of initiators. The polyol is not limited to that which is formed by any particular preparation method.

Other suitable polyether polyols include polyether diols and triols, such as polyoxypropylene diols and triols and poly(oxyethylene-oxypropylene)diols and triols obtained by the simultaneous or sequential addition of ethylene and propylene oxides to di- or trifunctional initiators. Polyether polyols having higher functionalities than triols can also be utilize in lieu of or in addition to polyether diols and/or triols. Copolymers having oxyethylene contents of from 5 to 90% by weight, based on the weight of the polyol component, of which the polyols may be block copolymers, random/block copolymers or random copolymers, can also be used. Yet other suitable polyether polyols include polytetramethylene glycols obtained by the polymerization of tetrahydrofu ran.

Polyester polyols suitable for the isocyanate-reaction component include, but are not limited to, hydroxyl-functional reaction products of polyhydric alcohols, such as ethylene glycol, propylene glycol, diethylene glycol, 1,4-butanediol, neopentylglycol, 1,6-hexanediol, cyclohexane dimethanol, glycerol, trimethylolpropane, pentaerythritol, sucrose, or polyether polyols or mixtures of such polyhydric alcohols, and polycarboxylic acids, particularly dicarboxylic acids or their ester-forming derivatives, for example succinic, glutaric and adipic acids or their dimethyl esters, sebacic acid, phthalic anhydride, tetrachlorophthalic anhydride, dimethyl terephthalate or mixtures thereof. Polyester polyols obtained by the polymerization of lactones, e.g. caprolactone, in conjunction with a polyol, or of hydroxy carboxylic acids, e.g. hydroxy caproic acid, may also be used. In certain embodiments, the polyol comprises a mixture of polyester and polyether polyols.

Suitable polyesteramides polyols may be obtained by the inclusion of aminoalcohols such as ethanolamine in polyesterification mixtures. Suitable polythioether polyols include products obtained by condensing thiodiglycol either alone or with other glycols, alkylene oxides, dicarboxylic acids, formaldehyde, aminoalcohols or aminocarboxylic acids. Suitable polycarbonate polyols include products obtained by reacting diols such as 1,3-propanediol, 1,4-butanediol, 1,6-hexanediol, diethylene glycol or tetraethylene glycol with diaryl carbonates, e.g. diphenyl carbonate, or with phosgene. Suitable polyacetal polyols include those prepared by reacting glycols such as diethylene glycol, triethylene glycol or hexanediol with formaldehyde. Other suitable polyacetal polyols may also be prepared by polymerizing cyclic acetals. Suitable polyolefin polyols include hydroxy-terminated butadiene homo- and copolymers and suitable polysiloxane polyols include polydimethylsiloxane diols and triols.

In certain embodiments, the polyol is a polymer polyol. In specific embodiments, the polymer polyol is a graft polyol. Graft polyols may also be referred to as graft dispersion polyols or graft polymer polyols. Graft polyols often include products, i.e., polymeric particles, obtained by the in-situ polymerization of one or more vinyl monomers, e.g. styrene monomers and/or acrylonitrile monomers, and a macromer in a polyol, e.g. a polyether polyol.

In other embodiments, the polymer polyol is chosen from polyharnstoff (PHD) polyols, polyisocyanate polyaddition (PIPA) polyols, and combinations thereof. It is to be appreciated that the isocyanate-reactive component can include any combination of the aforementioned polymer polyols. PHD polyols are typically formed by in-situ reaction of a diisocyanate with a diamine in a polyol to give a stable dispersion of polyurea particles. PIPA polyols are similar to PHD polyols, except that the dispersion is typically formed by in-situ reaction of a diisocyanate with an alkanolamine instead of a diamine, to give a polyurethane dispersion in a polyol.

It is to be appreciated that the isocyanate-reactive component may include any combination of two or more polyols that are different from one another based on functionality, molecular weight, viscosity, or structure.

In various embodiments, the polyol has a hydroxyl (OH) equivalent weight of from greater than 0 to 2,000, alternatively from greater than 0 to 1,700, alternatively from greater than 0 to 1,000, alternatively from greater than 0 to 700, alternatively from greater than 0 to 400, alternatively from greater than 0 to 350, alternatively from greater than 0 to 325, alternatively from greater than 0 to 300, alternatively from greater than 0 to 275, alternatively from greater than 0 to 250, alternatively from greater than 0 to 225, alternatively from greater than 0 to 200, g/mol. In certain embodiments, including the ranges above, the OH equivalent weight of the polyol is at least 30 g/mol. Methods of determining OH equivalent weight are known in the art based on functionality and molecular weight of a given polyol.

In these or other embodiments, the polyol has a functionality of from 2 to 10, alternatively from 2 to 9, alternatively from 2 to 8, alternatively from 2 to 7, alternatively from 3 to 6.

In specific embodiments, the polyol comprises, alternatively consists essentially of, alternatively consists of, one or more polyether polyols. Said differently, in these embodiments, the polyol is typically free from any polyols that are not polyether polyols. In other specific embodiments, the polyol comprises, alternatively consists essentially of, alternatively consists of, one or more polyester polyols. Said differently, in these embodiments, the polyol is typically free from any polyols that are not polyester polyols.

As understood in the art, polyurethanes comprise organic units joined by carbamate (urethane) bonds. Polyurethanes are generally formed by reacting a polyisocyanate and a polyol, which is typically a polyether polyol. Because polyurethanes contain two types of monomers, which polymerize one after the other, they are generally classed as alternating copolymers. Both the isocyanates and polyols used to make polyurethanes contain, on average, two or more functional groups per molecule. Polyisocyanurates are also prepared by reacting a polyisocyanate and a polyol. However, in preparing polyisocyanurates, a proportion of methylene diphenyl diisocyanate ("MDI") utilized is typically high and a polyester-derived polyol is used in the reaction instead of a polyether polyol. The resulting chemical structure is significantly different than that of a polyurethane, with the isocyanate groups on the MDI trimerising to form isocyanurate groups which the polyols link together, giving a complex polymeric structure. As such, the selection of the polyol in the isocyanate-reactive component is typically a function of end use of the isocyanate-reactive component, e.g. to give a polyurethane, a polyisocyanurate, or a hybrid polyurethane/polyisocyanurate.

In certain embodiments, the isocyanate-reactive component includes further comprises a blowing agent. In instances where a blowing agent is already present, e.g. water, or generated during reaction, e.g. carbon dioxide, the blowing agent may be referred to as a supplemental blowing agent, although the supplemental blowing agent may provide a majority or all of the foaming during reaction of the isocyanate-reactive component with a polyisocyanate. If utilized, the blowing agent can be selected from the group of chemical blowing agents, physical blowing agents, and combinations thereof. Examples of such blowing agents are described below.

The amount of blowing agent utilized can vary depending on the desired outcome. For example, the amount of blowing agent can be varied to tailor final foam density and foam rise profile, as well as cell size in the final foam.

In various embodiments, the chemical blowing agent is selected from the group of Si-OH compounds, which may be monomers, oligomers, or polymers. In certain embodiments, the chemical blowing agent is selected from the group consisting of organosilanes and organosiloxanes having at least one silanol (Si—OH) group. Examples of suitable OH-functional compounds include dialkyl siloxanes, such as OH-terminated dimethyl siloxanes. Such siloxanes may have a relatively low viscosity, such as 10 to 5,000, alternatively from 10 to 2,500, alternatively from 10 to 1,000, alternatively from 10 to 500, or alternatively from 10 to 100, mPa·s at 25° C. Alternatively, the chemical blowing agent can comprise formic acid.

In specific embodiments, the chemical blowing agent comprises, alternatively is, water. In one embodiment, the amount of water present in the isocyanate-reactive component to give a concentration from 0.02 to 5, alternatively from 0.02 to 4, alternatively from 0.02 to 3, alternatively from 0.02 to 2, 0.02 to 1, alternatively from 0.03 to 0.9, alternatively from 0.05 to 0.8%, alternatively from 0.1 to 0.7, wt. % based on the total weight of the isocyanate-reactive component and the polyisocyanate, which is described further below.

In various embodiments, the isocyanate-reactive component includes a physical blowing agent. The physical blowing agent may be used in addition or alternate to the chemical blowing agent.

In various embodiments, the physical blowing agent is one that undergoes a phase change from a liquid to a gaseous state during exposure to atmospheric pressure and a temperature ≥10° C., alternatively ≥20° C., alternatively ≥30° C., alternatively ≥40° C., alternatively ≥50° C., alternatively ≥60° C., alternatively ≥70° C., alternatively ≥80° C., alternatively ≥90° C., alternatively ≥100° C. The boiling point temperature generally depends upon the particular type of physical blowing agent.

Useful physical blowing agents include hydrocarbons, such as pentane, hexane, halogenated, more particularly chlorinated and/or fluorinated, hydrocarbons, for example methylene chloride, chloroform, trichloroethane, chlorofluorocarbons, hydrochlorofluorocarbons ("HCFCs"), ethers, ketones and esters, for example methyl formate, ethyl formate, methyl acetate or ethyl acetate, in liquid form or air, and nitrogen or carbon dioxide as gases. In specific embodiments, the physical blowing agent comprises or is n-pentane. In certain embodiments, the physical blowing agent comprises a compound selected from the group consisting of propane, butane, isobutane, isobutene, isopentane, cyclopentane, n-pentane, dimethylether, or mixtures thereof. In many embodiments, the blowing agent comprises a compound that is inert.

In various embodiments, the physical blowing agent comprises a hydrofluorocarbon ("HFC"). "Hydrofluorocarbon" and "HFC" are interchangeable terms and refer to an organic compound containing hydrogen, carbon, and fluorine. The compound is substantially free of halogens other than fluorine.

Examples of suitable HFCs include aliphatic compounds such as 1,1,1,3,3-pentafluoropropane (HFC-245fa), 1,1,1,3,3-pentafluorobutane (HFC-365mfc), 1-fluorobutane, nonafluorocyclopentane, perfluoro-2-methylbutane, 1-fluorohexane, perfluoro-2,3-dimethylbutane, perfluoro-1,2-dimethylcyclobutane, perfluorohexane, perfluoroisohexane, perfluorocyclohexane, perfluoroheptane, perfluoroethylcyclohexane, perfluoro-1,3-dimethyl cyclohexane, and perfluorooctane, 1,1,1,2-tetrafluoroethane (HFC-134a); as well as aromatic compounds such as fluorobenzene, 1,2-difluorobenzene; 1,4-difluorobenzene, 1,3-difluorobenzene; 1,3,5-trifluorobenzene; 1,2,4,5-tetrafluorobenzene, 1,2,3,5-tetrafluorobenzene, 1,2,3,4-tetrafluorobenzene, pentafluorobenzene, hexafluorobenzene, and 1-fluro-3-(trifluoromethyl) benzene. In certain embodiments, HFC-365mfc and HFC-245fa may be preferred due to their increasing availability and ease of use, with HFC-365mfc having a higher boiling point than HFC-245fa which may be useful in certain applications. For example, HFCs having a boiling point higher than 30° C., such as HFC-365mfc, may be desirable because they do not require liquefaction during foam processing.

An additional example of a physical blowing agent a hydrofluoro-olefin (HFO), such as trans-1,3,3,3-tetrafluoroprop-1-ene (HFO-1234ze, available from Honeywell under the Solstice ze tradename), trans-1-chloro-3,3,3-trifluoropropene (HFO-1233zd, available from Arkema under the Forane tradename), 2,3,3,3-Tetrafluoroprop-1-ene (HFO-1234yf, available from Honeywell under the Solstice yf tradename, and Chemours under the Opteon YF tradename), cis-1,1,1,4,4,4-hexafluoro-2-butene (HFO-1336mzz-Z, available from Chemours under the Opteon MZ tradename), and Opteon 1150.

In specific embodiments, the isocyanate-reactive component comprises a physical blowing agent comprising a hydrocarbon. In various embodiments in which the isocyanate-reactive component comprises the physical blowing agent, the physical blowing agent is present in the isocyanate-reactive component in an amount of from greater than 0 to 60, alternatively from 5 to 55, alternatively from 10 to 50, alternatively from 15 to 45, alternatively from 20 to 45, alternatively from 25 to 45, parts by weight based on 100 parts by weight of polyol in the isocyanate-reactive component. The inventive surfactant has excellent properties at stabilizing the isocyanate-reactive component including such physical blowing agents. Conventional surfactants result in phase separation prior to end use of isocyanate-reactive components including similar loadings of physical blowing agents.

In various embodiments, the isocyanate-reactive component additionally comprises a catalyst. Although the isocyanate-reactive component is generally reacted with a polyisocyanate in the presence of a catalyst, the catalyst may be in a part separate from the isocyanate-reactive component and combined at the time reaction, or may be present in the isocyanate-reactive component, e.g. in the case of two component (2k) systems.

In one embodiment, the catalyst comprises a tin catalyst. Suitable tin catalysts include tin(II) salts of organic carboxylic acids, e.g. tin(II) acetate, tin(II) octoate, tin(II) ethylhexanoate and tin(II) laurate. In one embodiment, the catalyst comprises dibutyltin dilaurate, which is a dialkyltin(IV) salt of an organic carboxylic acid. Specific examples of suitable organometallic catalyst, e.g. dibutyltin dilaurates, are commercially available from Air Products and Chemicals, Inc. of Allentown, PA, under the trademark DABCO®. The organometallic catalyst can also comprise other dialkyltin(IV) salts of organic carboxylic acids, such as dibutyltin diacetate, dibutyltin maleate and dioctyltin diacetate.

Examples of other suitable catalysts include iron(II) chloride; zinc chloride; lead octoate; tris(dialkylaminoalkyl)-s-hexahydrotriazines including tris(N,N-dimethylaminopropyl)-s-hexahydrotriazine; tetraalkylammonium hydroxides including tetramethylammonium hydroxide; alkali metal hydroxides including sodium hydroxide and potassium hydroxide; alkali metal alkoxides including sodium methoxide and potassium isopropoxide; and alkali metal salts of long-chain fatty acids having from 10 to 20 carbon atoms and/or lateral OH groups.

Further examples of other suitable catalysts, specifically trimerization catalysts, include N,N,N-dimethylaminopropylhexahydrotriazine, potassium, potassium acetate, potassium 2-ethylhexanoate N,N,N-trimethyl isopropyl amine/formate, and combinations thereof.

Yet further examples of other suitable catalysts, specifically tertiary amine catalysts, include dimethylaminoethanol, dimethylaminoethoxyethanol, triethylamine, N,N,N',N'-tetramethylethylenediamine, triethylenediamine (also known as 1,4-diazabicyclo[2.2.2]octane), N,N-dimethylaminopropylamine, N,N,N',N',N"-pentamethyldipropylenetriamine, tris(dimethylaminopropyl)amine, N,N-dimethylpiperazine, tetramethylimino-bis(propylamine), dimethylbenzylamine, trimethylamine, triethanolamine, N,N-diethyl ethanolamine, N-methylpyrrolidone, N-methylmorpholine, N-ethylmorpholine, bis(2-dimethylaminoethyl)ether, N,N-dimethylcyclohexylamine ("DMCHA"), N,N,N',N',N"-pentamethyldiethylenetriamine, 1,2-dimethylimidazole, 3-(dimethylamino) propylimidazole, 2,4,6-tris (dimethylaminomethyl) phenol, and combinations thereof. The (E) catalyst can comprise delayed action tertiary amine based on 1,8-diazabicyclo[5.4.0]undec-7-ene ("DBU"). Alternatively or in addition, the catalyst can comprise N,N,N'-trimethyl-N'-hydroxyethyl-bisaminoethylether and/or ethylenediamine. The tertiary amine catalysts can be further modified for use as delayed action catalysts by addition of approximately the same stoichiometric amount of acidic proton containing acid, such as phenols or formic acid. Such delayed action catalysts are commercially available from Air Products and Evonik.

The catalyst may be utilized neat or disposed in a carrier vehicle. Carrier vehicles are known in the art and further described below as an optional component for the isocyanate-reactive component. If the carrier vehicle is utilized and solubilizes the catalyst, the carrier vehicle may be referred to as a solvent. The carrier vehicle can be isocyanate-reactive, e.g. an alcohol-functional carrier vehicle, such as dipropylene glycol.

The catalyst can be utilized in various amounts. The catalyst may include any combination of different catalysts.

The isocyanate-reactive component may optionally further include an additive component. The additive component may be selected from the group of catalysts, blowing agents, plasticizers, cross-linking agents, chain-extending agents, chain-terminating agents, wetting agents, surface modifiers, waxes, foam stabilizing agents, moisture scavengers, desiccants, viscosity reducers, cell-size reducing compounds, reinforcing agents, dyes, pigments, colorants, fillers, flame retardants, mold release agents, anti-oxidants, compatibility agents, ultraviolet light stabilizers, thixotropic agents, anti-aging agents, lubricants, coupling agents, solvents, rheology promoters, adhesion promoters, thickeners, fire retardants, smoke suppressants, anti-static agents, anti-microbial agents, and combinations thereof.

One or more of the additives can be present as any suitable weight percent (wt. %) of the isocyanate-reactive component, such as 0.1 wt. % to 15 wt. %, 0.5 wt. % to 5 wt. %, or 0.1 wt. % or less, 1 wt. %, 2, 3, 4, 5, 6, 7, 8, 9, 10, 11, 12, 13, 14, or 15 wt. % or more of the isocyanate-reactive component. One of skill in the art can readily determine a suitable amount of additive depending, for example, on the type of additive and the desired outcome. Certain optional additives are described in greater detail below.

Suitable carrier vehicles include silicones, both linear and cyclic, organic oils, organic solvents and mixtures of these.

The carrier vehicle may also be a low viscosity organopolysiloxane or a volatile methyl siloxane or a volatile ethyl siloxane or a volatile methyl ethyl siloxane having a viscosity at 25° C. in the range of 1 to 1,000 $mm^2$/sec, such as hexamethylcyclotrisiloxane, octamethylcyclotetrasiloxane, decamethylcyclopentasiloxane, dodecamethylcyclohexasiloxane, octamethyltrisiloxane, decamethyltetrasiloxane, dodecamethylpentasiloxane, tetradecamethylhexasiloxane, heptamethyl-3-{(trimethylsilyl)oxy)}trisiloxane, hexamethyl-3,3,bis{(trimethylsilyl)oxy}trisiloxane pentamethyl{(trimethylsilyl)oxy}cyclotrisiloxane as well as polydimethylsiloxanes, polyethylsiloxanes, polymethylethylsiloxanes, polymethylphenylsiloxanes, polydiphenylsiloxanes, caprylyl methicone, and any mixtures thereof.

Suitable surfactants (or "foaming aids") include silicone polyethers, ethylene oxide polymers, propylene oxide polymers, copolymers of ethylene oxide and propylene oxide, other non-ionic surfactants, and combinations thereof. Further suitable surfactants may comprise a nonionic surfactant, a cationic surfactant, an anionic surfactant, an amphoteric surfactant, or a mixture of such surfactants. The compound is present in the isocyanate-reactive component as a surfactant. Thus, any additional or optional surfactant can be referred to as a supplemental surfactant.

The supplemental surfactant can comprise a fluorocarbon surfactant or fluorinated surfactant. The fluorinated surfactants can be any of those compounds known in the art which contain fluorine atoms on carbon and are also surfactants. These fluorinated surfactants can be organic or silicon-containing. For example, fluorinated organic surfactants can be perfluorianted polyethers such as those which have repeating units of the formulae:

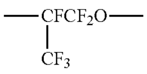 or $-CF_2CF_2O-$ and mixtures of such units.

Silicon-containing fluorinated surfactants can be siloxanes, for example, which contain organic radicals having fluorine bonded thereto, such as siloxanes having repeating units of the formulae:

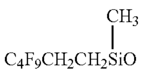 or 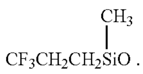 .

In various embodiments, adding the fluorinated surfactant to the isocyanate-reactive component decreases the cured foam density of the article formed therefrom. In general, increasing the amount of fluorinated surfactant in the isocyanate-reactive component decreases the density of the foam. This is especially true for slow cure systems, where the surfactant stabilizes bubbles while the network forms and cures.

In various embodiments, the isocyanate-reactive component further comprises an organopolysiloxane resin ("resin"). Suitable resins are as describe above. In certain embodiments, the resin is an MQ resin. The resin can be useful for stabilizing the foam.

Suitable pigments are understood in the art. In various embodiments, the isocyanate-reactive component further comprises carbon black, e.g. acetylene black.

The isocyanate-reactive component may include one or more fillers. The fillers may be one or more reinforcing fillers, non-reinforcing fillers, or mixtures thereof. Examples of finely divided, reinforcing fillers include high surface area fumed and precipitated silicas including rice hull ash and to a degree calcium carbonate. Fumed silica can include types that are surface-functionalized, such as hydrophilic or hydrophobic, and are available from Cabot Corporation under the CAB-O-SIL tradename. Examples of finely divided non-reinforcing fillers include crushed quartz, diatomaceous earths, barium sulphate, iron oxide, titanium dioxide and carbon black, talc, and wollastonite. Other fillers which might be used alone or in addition to the above include carbon nanotubes, e.g. multiwall carbon nanotubes aluminite, hollow glass spheres, calcium sulphate (anhydrite), gypsum, calcium sulphate, magnesium carbonate, clays such as kaolin, aluminum trihydroxide, magnesium hydroxide (brucite), graphite, copper carbonate, e.g. malachite, nickel carbonate, e.g. zarachite, barium carbonate, e.g. witherite and/or strontium carbonate e.g. strontianite. Further alternative fillers include aluminum oxide, silicates from the group consisting of olivine group; garnet group; aluminosilicates; ring silicates; chain silicates; and sheet silicates. In certain embodiments, the isocyanate-reactive component includes at least one filler comprising hollow particles, e.g. hollow spheres. Such fillers can be useful for contributing to porosity and/or overall void fraction of the foam. Fillers, when utilized, can be used in the isocyanate-reactive component in amounts of from 0.01 to 50, alternatively from 0.05 to 40, alternatively from 0.1 to 35, wt.% based on the total weight of the isocyanate-reactive component. In addition, fumed silica, if utilized, can be used in amounts from 0.01 to 5, alternatively from 0.05 to 3, alternatively from 0.1 to 2.5, alternatively from 0.2 to 2.2 wt. % based on the total weight of the isocyanate-reactive component.

The filler if present, may optionally be surface treated with a treating agent. Treating agents and treating methods are understood in the art. The surface treatment of the filler(s) is typically performed, for example with a fatty acid or a fatty acid ester such as a stearate, or with organosilanes, organosiloxanes, or organosilazanes such as hexaalkyl disilazane or short chain siloxane diols. Generally the surface treatment renders the filler(s) hydrophobic and therefore easier to handle and obtain a homogeneous mixture with the other components in the isocyanate-reactive component. Silanes such as $R^5_eSi(OR^6)_{4-e}$ where $R^5$ is a substituted or unsubstituted monovalent hydrocarbon group of 6 to 20 carbon atoms, for example, alkyl groups such as hexyl, octyl, dodecyl, tetradecyl, hexadecyl, and octadecyl, and aralkyl groups such as benzyl and phenylethyl, $R^6$ is an alkyl group of 1 to 6 carbon atoms, and subscript "e" is equal to 1 , 2 or 3, may also be utilized as the treating agent for fillers.

In various embodiments, the isocyanate-reactive component further comprises an adhesion-imparting agent. The adhesion-imparting agent can improve adhesion of the foam to a base material being contacted during curing. In certain embodiments, the adhesion-imparting agent is selected from organosilicon compounds having at least one alkoxy group bonded to a silicon atom in a molecule. This alkoxy group is exemplified by a methoxy group, an ethoxy group, a propoxy group, a butoxy group, and a methoxyethoxy group. Moreover, non-alkoxy groups bonded to a silicon atom of this organosilicon compound are exemplified by substituted or non-substituted monovalent hydrocarbon groups such as alkyl groups, alkenyl groups, aryl groups, aralkyl groups, halogenated alkyl groups and the like; epoxy group-containing monovalent organic groups such as a 3-glycidoxypropyl group, a 4-glycidoxybutyl group, or similar glycidoxyalkyl groups; a 2-(3,4-epoxycyclohexyl) ethyl group, a 3-(3,4-epoxycyclohexyl)propyl group, or similar epoxycyclohexylalkyl groups; and a 4-oxiranylbutyl group, an 8-oxiranyloctyl group, or similar oxiranylalkyl groups; acrylic group-containing monovalent organic groups such as a 3-methacryloxypropyl group and the like; and a hydrogen atom.

This organosilicon compound generally has a silicon-bonded alkenyl group or silicon-bonded hydrogen atom. Moreover, due to the ability to impart good adhesion with respect to various types of base materials, this organosilicon compound generally has at least one epoxy group-containing monovalent organic group in a molecule. This type of organosilicon compound is exemplified by organosilane compounds, organosiloxane oligomers and alkyl silicates. Molecular structure of the organosiloxane oligomer or alkyl silicate is exemplified by a linear chain structure, partially branched linear chain structure, branched chain structure, ring-shaped structure, and net-shaped structure. A linear chain structure, branched chain structure, and net-shaped structure are typical. This type of organosilicon compound is exemplified by silane compounds such as 3-glycidoxypropyltrimethoxysilane, 2-(3,4-epoxycyclohexyl)-ethyltrimethoxysilane, 3-methacryloxy propyltrimethoxysilane, and the like; siloxane compounds having at least one silicon-bonded alkenyl group or silicon-bonded hydrogen atom, and at least one silicon-bonded alkoxy group in a molecule; mixtures of a silane compound or siloxane compound having at least one silicon-bonded alkoxy group and a siloxane compound having at least one silicon-bonded hydroxyl group and at least one silicon-bonded alkenyl group in the molecule; and methyl polysilicate, ethyl polysilicate, and epoxy group-containing ethyl polysilicate.

In specific embodiments, the isocyanate-reactive component, and in particular, the isocyanate-reactive component, can further comprise a chain-extending agent. Suitable chain extending agents include any of the components listed above as initiators for the polyol, which may be used alone or in combination as the chain-extending agent, when present, separate from and in addition to the polyol.

Any of the optional additives, if utilized in the isocyanate-reactive component, may be present in the isocyanate-reactive component or as a separate component in the composition. Alternatively, optional additives that are not isocyanate-reactive, e.g. fillers, etc., may be included with the polyisocyanate in the isocyanate component described below. Typically, the composition is a 2k (two-component) composition, where the isocyanate component consists of the polyisocyanate and the isocyanate-reactive component comprising the remaining components utilized.

In certain embodiments, the isocyanate-reactive component has a viscosity at 25° C. of less than 1,500, alternatively less than 1,400, alternatively less than 1,300, alternatively less than 1,200, alternatively less than 1,100, alternatively less than 1,000, alternatively less than 900, alternatively less than 875, alternatively less than 850, centipoise. Dynamic viscosity may be measured via a TA Instruments AR 2000 rheometer with 45 mm cone-plate geometry at a constant shear rate of 10 $s^{-1}$ with temperature ramp rate of 3° C./min from 20 to 80° C. Kinematic viscosity can be measured in accordance with ASTM D445. These ranges apply even when the composition is a 2k composition and the isocyanate-reactive component includes everything in the composition other than the polyisocyanate. This viscosity range allows for the isocyanate-reactive component to flow freely, which is advantageous for certain end use applications where foaming is desired in or on certain substrates or articles, including those defining gaps and/or orifices.

The present disclosure also provides a composition, comprising: (1) the isocyanate-reactive component; (2) an isocyanate component comprising a polyisocyanate; and a catalyst. As introduced above, the catalyst is typically present in the (1) isocyanate-reactive component in the composition. However, the catalyst can alternatively be present in the (2) isocyanate component or separate from the (1) isocyanate-reactive component and the (2) isocyanate component.

Suitable polyisocyanates have two or more isocyanate functionalities, and include conventional aliphatic, cycloaliphatic, araliphatic and aromatic isocyanates. The polyisocyanate may be selected from the group of diphenylmethane diisocyanates ("MDI"), polymeric diphenylmethane diisocyanates ("pMDI"), toluene diisocyanates ("TDI"), hexamethylene diisocyanates ("HDI"), dicyclohexylmethane diisocyanates ("HMDI"), isophorone diisocyanates ("IPDI"), cyclohexyl diisocyanates ("CHDI"), naphthalene diisocyanate ("NDI"), phenyl diisocyanate ("PDI"), and combinations thereof. In certain embodiments, the polyisocyanate comprises, consists essentially of, or is a pMDI. In one embodiment, the polyisocyanate is of the formula OCN—R—NCO, wherein R is an alkyl moiety, an aryl moiety, or an arylalkyl moiety. In this embodiment, the polyisocyanate can include any number of carbon atoms, typically from 4 to 20 carbon atoms.

Specific examples of suitable polyisocyanates include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and preferably 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane, 2,4- and 2,6-hexahydrotoluene diisocyanate as well as the corresponding isomeric mixtures, 4,4'- 2,2'-, and 2,4'-dicyclohexylmethane diisocyanate as well as the corresponding isomeric mixtures, and aromatic diisocyanates and polyisocyanates such as 2,4- and 2,6-toluene diisocyanate and the corresponding isomeric mixtures, 4,4'-, 2,4'-, and 2,2'-diphenylmethane diisocyanate and the corresponding isomeric mixtures, mixtures of 4,4'-, 2,4'-, and 2,2-diphenylmethane diisocyanates and polyphenylenepolymethylene polyisocyanates, as well as mixtures of MDI and toluene diisocyanate (TDI).

The polyisocyanate may include modified multivalent isocyanates, i.e., products obtained by the partial chemical reaction of organic diisocyanates and/or polyisocyanates. Examples of suitable modified multivalent isocyanates include diisocyanates and/or polyisocyanates containing ester groups, urea groups, biuret groups, allophanate groups, carbodiimide groups, isocyanurate groups, and/or urethane groups. Specific examples of suitable modified multivalent isocyanates include organic polyisocyanates containing urethane groups and having an NCO content of 15 to 33.6 parts by weight based on the total weight, e.g. with low molecular weight diols, triols, dialkylene glycols, trialkylene glycols, or polyoxyalkylene glycols with a molecular weight of up to 6000; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Prepolymers containing NCO groups with an NCO content of from 3.5 to 29 parts by weight based on the total weight of the isocyanate and produced from the polyester polyols and/or polyether polyols; 4,4'-diphenylmethane diisocyanate, mixtures of 2,4'- and 4,4'-diphenylmethane diisocyanate, 2,4- and/or 2,6-toluene diisocyanates or polymeric MDI are also suitable. Furthermore, liquid polyisocyanates containing carbodiimide groups having an NCO content of from 15 to 33.6 parts by weight based on the total weight of the (2) isocyanate component, may also be suitable, e.g. based on 4,4'- and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'- and/or 2,6-toluene diisocyanate.

It is to be appreciated that the polyisocyanate may include any combination of two or more polyisocyanates that are different from one another based on functionality, molecular weight, viscosity, or structure. In specific embodiments, the polyisocyanate comprises, consists essentially of, or is, a pMDI.

The polyisocyanate typically has a functionality of from 2.0 to 5.0, alternatively from 2.0 to 4.5, alternatively from 2.0 to 4.0, alternatively from 2.0 to 3.5.

In these or other embodiments, the polyisocyanate has an NCO by weight of from 15 to 60, alternatively from 15 to 55, alternatively from 20 to 48.5, wt. %. Methods of determining content of NCO by weight are known in the art based on functionality and molecular weight of the particularly isocyanate.

In certain embodiments, the polyisocyanate is typically present in the composition in an amount to provide an isocyanate index of from 80 to 200, alternatively from 80 to 130, alternatively from 85 to 125, alternatively from 90 to 120, alternatively from 95 to 120, alternatively from 100 to 120, alternatively from 105 to 115. In other embodiments, the polyisocyanate is typically present in the composition in an amount to provide an isocyanate index of from 80 to 800, alternatively from 90 to 700, alternatively from 100 to 600, alternatively from 150 to 500, alternatively from 200 to 300. Isocyanate index is the molar ratio of NCO to isocyanate-reactive hydrogen functional groups, times 100. Isocyanate index and methods of its calculation are well known in the art.

The composition may be prepared by combining the (1) isocyanate-reactive component and the (2) isocyanate component, as well as any optional components, if not present in the (1) isocyanate-reactive component, in any order of addition. As described in greater detail below, the composition may be a one part composition, a two component (2K) composition, or a multi-part composition. When the (1) isocyanate-reactive component and the (2) isocyanate component are combined, particularly in the presence of the catalyst, a reaction is initiated, which results in a foamed article. The foamed article can be formed at room temperature and ambient conditions. Alternatively, at least one condition may be selectively modified during formation of the foamed article, e.g. temperature, humidity, pressure, etc.

The foamed article comprising the reaction product of the composition is also disclosed. The foamed article may be a foamed polyurethane, a foamed polyisocyanurate, or a foamed polyurethane/polyisocyanurate depending on the selection of the polyol of the isocyanate-reactive component and the polyisocyanate of the isocyanate component.

In many embodiments, the foamed article is a closed-cell foam. However, the foamed article can also be an open-cell foam or both a closed and open-cell foam.

In various embodiments, the foamed article has pores that are generally uniform in size and/or shape and/or distribution.

Average pore size can be determined via methods understood in the art. For example, ATSM method D3576-15 with the following modifications may be used: (1) image a foam using optical or electron microscopy rather than projecting the image on a screen; and (2) scribe a line of known length that spans greater than 15 cells rather than scribing a 30 mm line.

The foamed article, as well as a composite article comprising a substrate and the foamed article together, can be formed by disposing the composition on a substrate, and curing the composition.

The composition may be disposed or dispensed on the substrate in any suitable manner. Typically, the curable composition is applied in wet form via a wet coating technique. The curable composition may be applied by i) spin coating; ii) brush coating; iii) drop coating; iv) spray coating; v) dip coating; vi) roll coating; vii) flow coating; viii) slot coating; ix) gravure coating; x) Meyer bar coating; or xi) a combination of any two or more of i) to x).

The substrate is not limited and may be any substrate. The foamed article may be separable from the substrate, e.g. if the substrate is a mold, or may be physically and/or chemically bonded to the substrate depending on its selection. The substrate may optionally have a continuous or non-continuous shape, size, dimension, surface roughness, and other characteristics.

Alternatively, the substrate may comprise a plastic, which maybe a thermosetting and/or thermoplastic. However, the substrate may alternatively be or comprise glass, ceramic, metals such as titanium, magnesium, aluminum, carbon steel, stainless steel, nickel coated steel or alloys of such metal or metals, or a combination of different materials. Because the composition can cure at ambient conditions, elevated temperatures are not required to effect curing, which can damage certain substrates.

Specific examples of suitable substrates include polymeric substrates such polyamides (PA); polyesters such as polyethylene terephthalates (PET), polybutylene terephthalates (PET), polytrimethylene terephthalates (PTT), polyethylene naphthalates (PEN), and liquid crystalline polyesters; polyolefins such as polyethylenes (PE), ethylene/acidic monomer copolymers such as is available from Dow under the tradename Surlyn, polypropylenes (PP), and polybutylenes; polystyrene (PS) and other styrenic resins such as SB rubber; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones; polyvinyl alcohols (PVA); polyetheretherketones (PEEK); polyetherketoneketones (PEKK); polyarylates (PAR); polyethernitriles (PEN); phenolic resins; phenoxy resins; celluloses such as triacetylcellulose, diacetylcellulose, and cellophane; fluorinated resins, such as polytetrafluoroethylenes; thermoplastic elastomers, such as polystyrene types, polyolefin types, polyurethane types, polyester types, polyamide types, polybutadiene types, polyisoprene types, and fluoro types; and copolymers, and combinations thereof. Thermosetting resins can include epoxy, polyurethane, polyurea, phenol-formaldehyde, urea-formaldehyde, or combinations thereof. The substrate can include a coating, film, or layer disposed thereon. Coatings made from polymer latex can be used, such as latex from acrylic acid, acrylate, methacrylate, methacrylic acid, other alkylacrylate, other alkylacrylic acid, styrene, isoprene butylene monomers, or latex from the alkyl esters of the acid monomers mentioned in the foregoing, or latex from copolymers of the foregoing monomers. Composites based on any of these resins can be used as substrates by combining with glass fibers, carbon fibers, or solid fillers such as calcium carbonate, clay, aluminum hydroxide, aluminum oxide, silicon dioxide, glass spheres, sawdust, wood fiber, or combination thereof.

In specific embodiments, the substrate defines at least one gap, and disposing the composition comprises disposing the composition in the at least one gap such that the foamed article is present within the gap in the composite article. In some embodiments, the composition is generally flowable and will conform to the shape of the substrate at ambient conditions, including room temperature and atmospheric pressure.

The following examples, illustrating embodiments of this disclosure, are intended to illustrate and not to limit the invention. Unless otherwise noted, all reactions are carried out under air, and all components are purchased or otherwise obtained from various commercial suppliers.

Reference Example 1

The general procedure of Reference Example 1 is to prepare a species of component (A), the (A) organohydrogensiloxane.

In Reference Example 1, bulk reaction solvents were dried by passage through columns of alumina and Q5 reactive scavenger (known as Cu-0226 S, supplied by BASF). All other solvents were purchased from Aldrich as anhydrous grade and stored over activated 3 A molecular sieves prior to use. NMR solvents ($CDCl_3$, $CD_2Cl_2$, and $C_6D_6$), obtained from Cambridge Isotope Laboratories, Inc., were dried over active 3 Å molecular sieves or, in the case of $C_6D_6$, dried using Na/K alloy. 1-bromo-2,5-bis(trifluoromethyl)benzene was purchased from Oakwood Chemical. n-Butyllithium (solution in hexanes) was titrated using 1.00 M decanol in toluene with 1,10-phenanthroline as an indicator prior to use.[1]

Watson, S. C.; Eastham, J. F. "Colored indicators for simple direct titration of magnesium and lithium reagents", *J. Organomet. Chem.*, 1967, 9, 165-168.

Multinuclear NMR spectra ($^{1}H$, $^{13}C$, $^{19}F$, $^{29}Si$, $^{11}B$) were collected on one of the following instruments: Varian MR-400 or Varian VNMRS-500. $^{11}$ B NMR spectra were collected only on the Varian VNMRS-500. The $^{1}H$ and $^{13}C$ NMR chemical shifts were referenced in parts per million relative to residual solvent peaks: $^{1}H$-5.32 ppm for $CD_2Cl_2$, 7.15 ppm for $C_6D_6$, 7.25 ppm for $CDCl_3$; $^{13}C$-54.00 ppm for $CD_2Cl_2$, 128.00 ppm for $C_6D_6$, 77.00 ppm for $CDCl_3$. $^{11}$ B NMR chemical shifts were referenced externally to $BF_3$ ($Et_2O$) (0 ppm), $^{19}F$ NMR chemical shifts were referenced externally to $CFCl_3$ (0 ppm). Sub-ambient reaction temperatures, except when dry ice or ice were the sole means of cooling, were measured using an Extech Instruments EasyView™ 10 Dual K model EA 10 thermometer with a fine JKEM sensor PTFE wire K 361NJ.

A catalyst utilized to prepare certain species of component (A), was synthesized as follows:

Preparation of lithium isopropoxy bis(3,5-bis(trifluoromethyl)phenyl)(2,5-bis(trifluoromethyl)phenyl) borate

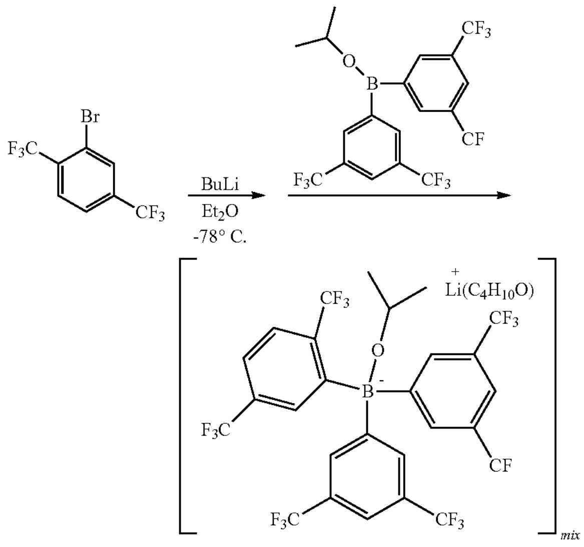

n-Butyllithium (4.00 mL, 2.535 M in hexanes, 10.14 mmol) was added slowly to a cold (−78° C., $CO_2$(s) bath) solution of 1-bromo-2,5-bis(trifluoromethyl)benzene (3.00 g, 10.24 mmol) in diethyl ether (200 mL). The reaction mixture was stirred for 1 hour at −78° C. Isopropoxy-bis(3,5-bis(trifluoromethyl)phenyl)borane (5.036 g, 10.15 mmol) in ether (18 mL) was added slowly. The reaction mixture was stirred for several hours at −78° C. The solution was warmed to ambient temperature while stirring overnight to give a pale-yellow clear solution. The volatiles were removed from the reaction mixture to give a yellow oil. The oil was extracted with benzene. There was nothing insoluble. The volatiles were removed from the reaction mixture to give a yellow oil. The yield was 7.88 g, 98.3%. $^{1}H$ NMR (400 MHz, Benzene-$d_6$) δ 8.06; (s, 1 H), 8.00; (s, 4H), 7.70; (dt, J=1.8, 0.9 Hz, 2H), 7.40; (d, J=8.3 Hz, 1H), 7.19; (d, J=8.4 Hz, 1H), 3.79; (hept, J=6.1 Hz, 1H), 2.78; (q, J=7.1 Hz, 4H), 0.73; (d, J=6.1 Hz, 6H), 0.54; (t, J=7.1 Hz, 6H). $^{13}C$ NMR (101 MHz, Benzene-$d_6$) δ 158.31, 153.97, 135.44; (q, J=3.7 Hz), 135.23, 133.55; (t, J=4.1 Hz), 133.25, 133.18, 132.37; (d, J=97.8 Hz), 130.92; (q, J=32.0 Hz), 127.80; (q, J=273.9 Hz), 124.92; (q, J=272.5 Hz), 124.66; (q, J=272.8 Hz), 123.86; (q, J=3.8 Hz), 119.86; (p, J=3.9 Hz), 66.24, 66.17, 25.60, 13.94. $^{19}F$ NMR (376 MHz, Benzene-$d_6$) δ −55.30–−55.51; (m), −62.82, −63.61. $^{11}B$ NMR (160 MHz, Benzene-$d_6$) δ 2.16.

In a nitrogen-purged glove-box, a 1 wt. % catalyst solution prepared in a glass vial by dissolving the catalyst prepared immediately above in anhydrous toluene. In a glass vial was placed the cyclic polyorganohydrogensiloxane (cyclic polymethylhydrogensiloxane mixture having DP=4 to 6, crude (not purified after production), 11.2 g) and a Teflon-coated stir bar. To the stirred solution was added the catalyst solution via micropipette (ex. 225 μL) followed by slow addition of a silanol-terminated polydimethylsiloxane, average DP=10.8 (ex. 8.4 g) over the course of 1 hour. Aliquots of the reaction mixture were taken, quenched with one drop of phenylacetylene and analyzed by $^{29}Si$ NMR in $CDCl_3$ containing $Cr(acac)_3$ as an NMR relaxation agent (~1 g/100 mL). Conversion was established by comparing the signals of $HOSi(Me)_2O$—(MOH) to $MeSiO_3$ (T). Conversion over 1.3 hours was 99%.

Stability in the general procedure above is monitored as follows: In a nitrogen-purged glove-box, the solution of 1 wt. % of the catalyst described above was prepared in a glass vial by dissolving the solid catalyst sample in anhydrous toluene. In a glass vial was placed the cyclic polyorganohydrogensiloxane (5 g) and a Teflon-coated stir bar. To the stirred solution was added the catalyst solution via micropipette (ex. 100.5 μL). Aliquots were sampled over time and quenched with a phenylacetylene/toluene mixture such that the toluene could act as an internal standard. The aliquots were then analyzed by GC. The relative amount of reaction was compared by monitoring the ratio of cyclic polyorganohydrogensiloxane to toluene standard. The cyclic polyorganohydrogensiloxane was monitored over time prior to addition of the silanol-terminated polydimethylsiloxane.

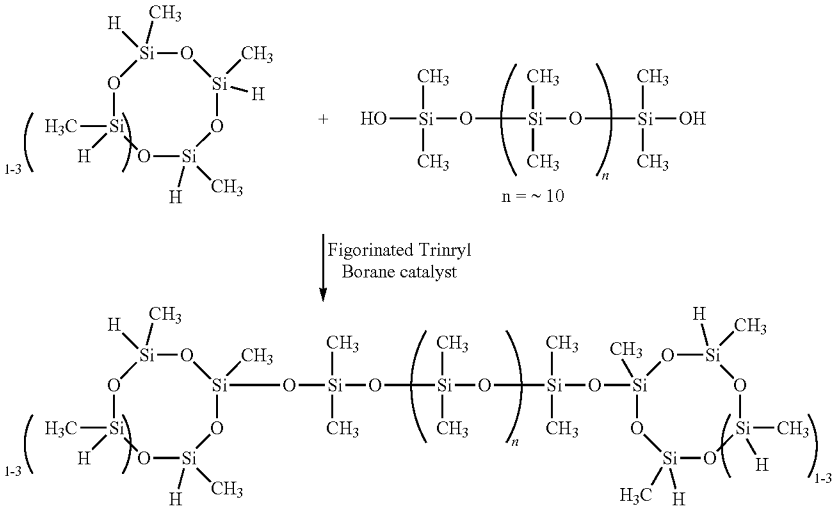

Melting and freezing point temperatures noted below are measured as follows: Using a 5-place analytical balance, the mass of a Tzero Pan with a Tzero Hermetic Lid is obtained. 7-12 mg of a particular sample is disposed into the pan, and using tweezers, the pan is disposed into blue-colored hermetic lower die and covered with a hermetic lid. The lower die is placed into the pan press and the press lever is moved to hermetically seal the lid onto the pan. The pan is removed with tweezers and placed into an Autosampler. The Autosampler utilizes the following testing scheme:

Sampling Interval: 0.20 s/pt
Data Storage: Off
Equilibrate at 60° C.
Isotermal for 5.00 min
Data Storage: On
Ramp −10.000° C./min to −90° C.
Isothermal for 10.00 minutes
Mark end of cycle 1
Ramp 10.000° C./min to 60° C.
Mark end of cycle 2
Data Storage: Off
Equilibrate at 40.00° C.

The various components utilized in Preparation Examples 1-4 and Comparative Preparation Examples 1-2 are set forth in Table 1 below.

TABLE 1

| Components/Compounds Utilized | |
|---|---|
| Component | Description |
| Component (A1) | 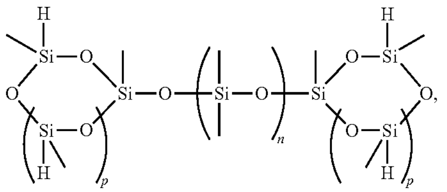 where subscript n is 10 and subscript p is an average of 3.5. |

TABLE 1-continued

| Components/Compounds Utilized | |
|---|---|
| Component | Description |
| Component (A2) | 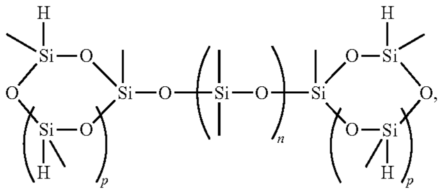 where subscript n is 40 and subscript p is an average of 4.0. |
| Component (A3) | 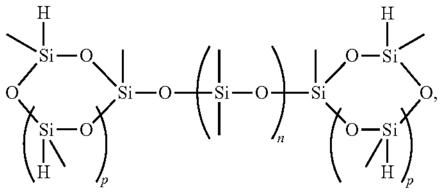 where subscript n is 40 and subscript p is an average of 4.9. |
| Component (A1') | $MD_{25}D'_6M$, where M is $(CH_3)_3SiO_{1/2}$, D is $(CH_3)_2SiO_{2/2}$, and D' is $CH_3HSiO_{2/2}$. |

TABLE 1-continued

| Components/Compounds Utilized | |
|---|---|
| Component | Description |
| Component (A2') | $MD_{14}D'_2M$, where M is $(CH_3)_3SiO_{1/2}$, D is $(CH_3)_2SiO_{2/2}$, and D' is $CH_3HSiO_{2/2}$. |
| Component (B1) | $H_2C{=}CH{-}CH_2{-}(EO)_{16}{-}H$, where EO indicates an ethylene oxide moiety. |
| Component (B2) | $H_2C{=}CH{-}CH_2{-}(EO)_{28}{-}H$, where EO indicates an ethylene oxide moiety. |
| Component (B3) | $H_2C{=}CH{-}CH_2{-}(EO)_{12}{-}H$, where EO indicates an ethylene oxide moiety. |
| Component (B4) | $H_2C{=}CH{-}CH_2{-}(EO)_7{-}H$, where EO indicates an ethylene oxide moiety. |
| Component (B5) | $H_2C{=}CH{-}CH_2{-}(EO)_{19}(PO)_{19}{-}CH_3$, where EO indicates an ethylene oxide moiety and PO indicates a propylene oxide moiety. |
| Component (C) | Platinum (Pt.) diluted to 0.5 wt.% or 1 wt.% as specified in isopropanol |
| Carrier | Isopropanol |

Preparation Example 1

A 250 mL 3-neck round bottom flask was charged with 54.94 g Component (B3) and 30.14 g Carrier. The flask was then equipped with an overhead mechanical stirrer (glass rod with Teflon paddle), a thermocouple with nitrogen inlet, and a water-cooled condenser connected to a bubbler. The contents of the flak were heated to 78° C. with an aluminum heating block under a slight nitrogen sweep and vigorous stirring (275 rpm). 0.16 g Component (C) (0.5 wt. % Pt.) are disposed in the flask. Then, 15.11 g Component (A1) are disposed in the flask incrementally. In particular, 1 mL of Component (C) is added at a time until temperature of the flask stabilizes and the contents of the flask become optically clear, repeated until a total of 15.11 g Component (A1) are disposed in the flask. An additional 0.17 g Component (C) is disposed in the flask during incremental addition of Component (A1). After disposing the total amount of Component (A1) utilized in the flak, the contents of the flask were heated at reflux (~84° C.) for ~1.5 h, resulting in a clear, amber colored solution. The resulting clear, amber colored solution was stripped of volatiles under vacuum with heat (6 torr, 100° C. for 1 h) to give a reaction product. The reaction product was transferred to a jar and determined to have a freezing point of −15.7° C. and a melting point of 18.1° C.

Preparation Example 2

A 250 mL 3-neck round bottom flask was charged with 16.94 grams of Component (A2) and 30.9 g Carrier. The flask was then equipped with an overhead mechanical stirrer (glass rod with Teflon paddle), a thermocouple with nitrogen inlet, and a water-cooled condenser connected to a bubbler. The contents of the flask were heated to 75° C. with an aluminum heating block under a slight nitrogen sweep and vigorous stirring (275 rpm). 43.08 g of Component (B1) was diluted with 10 g of Carrier to give a mixture. 25 g of the mixture was then added to the flask via syringe before catalyzing the contents of the flask with 0.191 mL Component (C) (1 wt. % Pt). The remaining amount of the mixture was added to the flask followed by another 76 μL (to give 10 ppm Pt) of Component (C). The contents of the flask were heated at reflux (~84° C.) for ~1.5 h, resulting in a clear, amber colored solution. The clear, amber colored solution was stripped of volatiles under vacuum with heat (6 torr, 100° C. for 1 h) to give a reaction product. The reaction product was transferred to a jar where it thickened to a honey-like consistency once cooled to RT. The reaction product was determined to have a freezing point of 5.5° C. and a melting point of 30.6° C.

Preparation Example 3

A 250 mL 3-neck round bottom flask was charged with 33.89 g of Component (B4), and 30 g of Carrier. The flask was then equipped with an overhead mechanical stirrer, a thermocouple with nitrogen inlet and a water-cooled condenser connected to a bubbler. The contents of the flask were heated to 78° C. with an aluminum heating block under a slight nitrogen sweep and vigorous stirring (275 rpm). 2 grams of Component (A2) were then added to the flask via syringe before catalyzing the contents of the flask with 0.12 mL Component (C) (1 wt. % Pt). The rest of Component (A2) (i.e., 24.17 g) was added in 1-2 mL portions over ~60 min with an additional amount of Component (C) (5 ppm Pt.) half way through while maintaining a temperature of 80-81° C., resulting in a clear, pale yellow solution. The clear, pale yellow solution was stripped of volatiles under vacuum and heat (6 torr, 100° C. for 1 h) to give a reaction product in the form of a viscous yellow liquid. The reaction product was determined to have a freezing point of −25.9° C. and a melting point of −2.2° C.

Preparation Example 4

A 250 mL 3-neck round bottom flask was charged with 8.30 g Component (A3), 32 g Carrier, and 51.94 g Component (B5). The flask was then equipped with an overhead mechanical stirrer (glass rod with Teflon paddle), a thermocouple with nitrogen inlet and a water-cooled condenser connected to a bubbler. The contents of the flask were heated to ~70° C. with a heating mantle under a slight nitrogen sweep and vigorous stirring (275 rpm). The reaction in the flask was catalyzed with 0.32 mL Component (C) (0.5 wt. % Pt for 20 ppm Pt.). After letting the reaction proceed in the flask for 3 hours to give a reaction mixture, the reaction mixture was stripped under vacuum and heat, down to 30 torr, at 80° C. for 1 h.

Comparative Preparation Example 1

A 250 mL 3-neck round bottom flask was charged with 30.1 g Carrier, 46.19 g Component (B1), and 17.61 g Component (A1'). The flask was then equipped with an overhead mechanical stirrer (glass rod with Teflon paddle), a thermocouple with nitrogen inlet and a water-cooled condenser connected to a bubbler. The contents of the flask were heated to 68.0° C. with a heating mantle under a slight nitrogen sweep and vigorous stirring (275 rpm). The reaction was then catalyzed with 0.122 mL Component (C) (1 wt. % Pt. for 15 ppm Pt.). The temperature of the flask from the reaction rose from 68.0° C. to 79.7° C., clearing near 79.5° C. The contents of the flask were then heated to reflux for 1 hour before allowing to cool to RT overnight to give a yellow solution. The yellow solution was stripped of volatiles under vacuum (6 torr, ramp to 100° C., held for 1 hour) resulting in a yellow liquid. The yellow liquid was measured to have a freezing point of 13.1° C. and a melting point of 30.8° C.

Comparative Preparation Example 2

A 250 mL 3-neck round bottom flask was charged with 55.39 g Component (B2), 20.20 g Component (A2') and 39 g Carrier. The flask was then equipped with an overhead mechanical stirrer (glass rod with Teflon paddle), a thermocouple with nitrogen inlet and a water-cooled condenser connected to a bubbler. The contents of the flask were heated to ~70° C. with an aluminum heating block under a slight nitrogen sweep and vigorous stirring (275 rpm). The reaction was then catalyzed with 0.05 mL Component (C) (1 wt. % Pt to give 5 ppm of Pt.). The set point was changed to 90° C. on the heating block and the reaction was heated at reflux for 1 hour. The reaction cleared near 83 ° C. while warming, resulting in a clear, amber colored liquid. The clear, amber colored liquid was then stripped under vacuum (6 torr, 100° C. for 2 h) to give a reaction product, which solidified upon cooling to RT.

Examples 1-3 and Comparative Examples 1-2

Isocyanate-reactive components are prepared with some of the compounds (i.e., reaction products) formed in Preparation Examples 1-4 and Comparative Preparation Examples 1-2. In particular, Example 1 utilizes the compound of Preparation Example 1, Example 2 utilizes the compound of Preparation Example 2, Example 3 utilizes the compound of Preparation Example 3, Comparative Example 1 utilizes the compound of Comparative Preparation Example 1, and Comparative Example 2 utilizes the compound of Comparative Preparation Example 2. The compounds of Preparation Examples 1-3 and Comparative Preparation Examples 1-2 are utilized in the isocyanate-reactive components of Examples 1-3 and Comparative Examples 1-2 as surfactants.

Table 2 below sets forth the amounts of each component utilized in the Isocyanate-reactive components of Examples 1-3 and Comparative Examples 1-2. Each value in Table 2 below is in parts by weight based on 100 parts by weight of the Polyol. The same components and amounts are utilized in Examples 1-3 and Comparative Examples 1-2 with the exception of the Surfactant, which is the respective compound prepared in each of Preparation Examples 1-3 and Comparative Preparation Examples 1-2 as noted above. Reference to the Surfactant in Table 2 below is different for each of Examples 1-3 and Comparative Examples 1-2 as set forth above.

TABLE 2

| Components | Chemical Name | Parts per 100 Parts Polyol |
|---|---|---|
| Polyol | Glycerol propylene oxide/ethylene oxide polyether polyol having a hydroxyl number of 374 mg KOH/g | 100.00 |
| Fire Retardant | Tris(2-chloroisopropyl) phosphate (TCPP) | 10.00 |
| Surfactant | Silicone Polyether | 2.5 |
| Blowing Agent 1 | Deionized Water | 0.25 |
| Blowing Agent 2 | n-pentane | 35.1 |
| Catalyst 1 | N,N,N',N",N"-pentamethyldiethylenetriamine | 0.38 |
| Catalyst 2 | Potassium 2-ethylhexanoate in diethylene glycol. | 7.67 |
| Catalyst 3 | Potassium acetate in diethylene glycol. | 2.19 |

General Procedure of Examples 1-3 and Comparative Examples 1-2

Each of Examples 1-3 and Comparative Examples 1-2 follow the same general procedure for preparing the respective isocyanate-reactive components. In particular, in each of Examples 1-3 and Comparative Examples 1-2, a 60 g sample is prepared for analysis via Turbiscan, with enough emulsion for a vial to be visually observed and inspected. In each of Examples 1-3 and Comparative Examples 1-2, the particular Surfactant utilized is mixed with the Polyol, Blowing Agent 1, Fire Retardant, Catalyst 1, Catalyst 2, and Catalyst 3 in a 250 mL Nalgene bottle to give a pre-blend. The Blowing Agent 2 is mixed into the pre-blend using an air driven mixer to avoid an ignition source with the Blowing Agent 2. The Blowing Agent 2 is added with an additional 1-2 grams to account for volatilization/evaporation during mixing. A small 3-blade propeller is used at ~3000 rpm to attain an emulsion of the pre-blend and Blowing Agent 2. The time to emulsion varies depending on surfactant from thirty seconds to five minutes. The emulsion is weighed, and the amount of the Blowing Agent 2 is adjusted, if necessary, targeting 35±2 wt. % of the emulsion. The emulsion was immediately transferred to a 30 mL vial for visual observation at RT. Observation ceased once creaming or breaking in the emulsion was visually observed. The results of visual observation are set forth below in Table 3. Stability is observed and determined to no longer exist upon phase separation of the particular isocyanate-reactive component (e.g. via breaking and/or creaming).

TABLE 3

Stability of General Procedure of Examples 1-3 and Comparative Examples 1-2.

| Example | Duration of stability |
|---|---|
| Example 1 | 2 days |
| Example 2 | 7 days |
| Example 3 | <1 h |
| Comparative Example 1 | <12 h |
| Comparative Example 2 | <1 h |

Prophetic Examples 1-3 and Prophetic Comparative Examples 1-2

The isocyanate-reactive components of Examples 1-3 and Comparative Examples 1-2 above are utilized to prepare polyurethane foams. In particular, each of the isocyanate-reactive components of Examples 1-3 and Comparative Examples 1-2 are reacted with a polymethylene polyphenylisocyanate that contains MDI (pMDI) having an NCO content of 30.9% as measured according to ASTM D5155 and a dynamic viscosity at 25° C. of 500 to 1,000 mPa·s as measured according to ASTM D4889. The pMDI is reacted with the isocyanate-reactive component in each of Examples 1-3 and Comparative Examples 1-2 in an amount of 350 parts by weight based on 100 parts by weight of Polyol in each isocyanate-reactive component.

The term "comprising" and derivatives thereof, such as "comprise" and "comprises" are used herein in their broadest sense to mean and encompass the notions of "including," "include," "consist(ing) essentially of," and "consist(ing) of". The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims.

What is claimed is:

1. A composition, comprising:

(A) an organohydrogensiloxane having the following structure:

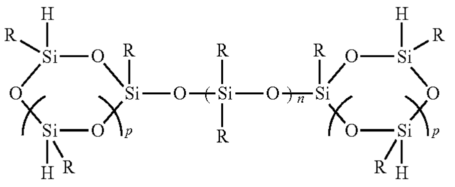

where subscript n is from 1 to 1,000; each subscript p is independently from 1 to 10; and each R is an independently selected substituted or unsubstituted hydrocarbyl group, wherein one or more silicon bonded hydrogen atoms may be replaced with a group having the formula:

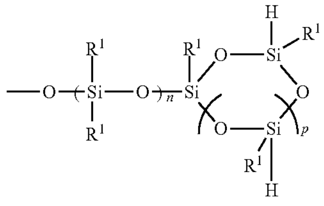

where subscript n is independently selected and defined above, subscript p is independently selected and defined above, and each $R^1$ is an independently selected substituted or unsubstituted hydrocarbyl group;

(B) a polyether compound having an aliphatically unsaturated group; and (C) a hydrosilylation catalyst.

2. The composition of claim 1, wherein: (i) each R is an independently selected unsubstituted hydrocarbyl group free of aliphatic unsaturation; (ii) each subscript p is independently 1 to 4; (iii) subscript n is from 1 to 200; or (iv) any combination of (i) to (iii).

3. The composition of claim 1, wherein the polyether compound (B) has the formula $R^2O(C_mH_{2m}O)_qR^3$, wherein $R^2$ is an aliphatically unsaturated group, subscript m is independently selected from 2 to 4 in each moiety indicated by subscript q; subscript q is from 1 to 200; and $R^3$ is selected from $R^1$, H, and —C(O)$R^1$, where $R^1$ is independently selected and defined above.

4. The composition of claim 1, wherein the (B) polyether compound (B) has the formula $R^2O(C_2H_4O)_x(C_3H_6O)_y(C_4H_8O)_zR^3$, wherein $R^2$ is an aliphatically unsaturated group; 0≤x≤200; 0≤y≤200; and 0≤z≤200; with the provisos that subscripts x, y and z are not simultaneously 0 and units indicated by subscripts x, y and z may be in randomized or block form in the (B)-polyether compound (B); and $R^3$ is selected from $R^1$, H, and —C(O)$R^1$, where $R^1$ is independently selected and defined above.

5. A silicone polyether surfactant obtained by the reaction of components (A) and (B) in the presence of component (C), wherein components (A), (B), and (C) are as set forth in claim 1.

6. A compound having the following structure:

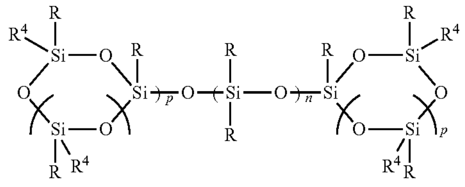

where each $R^4$ is independently selected from hydrogen, a substituted or unsubstituted hydrocarbyl group, a polyether group, or a group of formula

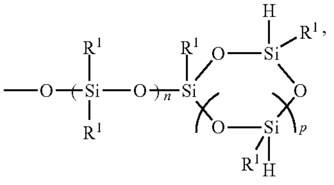

with the proviso that at least one of $R^4$ is the polyether group; each subscript p is independently from 1 to 10; each subscript n is independently from 1 to 2,000; each R is an independently selected substituted or unsubstituted hydrocarbyl group; and each $R^1$ is an independently selected substituted or unsubstituted hydrocarbyl group.

7. The compound of claim 6, wherein: (i) each R is an independently selected unsubstituted hydrocarbyl group free of aliphatic unsaturation; (ii) each R4 is a polyether group; (iii) each subscript p is independently 1 to 4; (iv) subscript n is from 1 to 200; or (v) any combination of (i) to (iv).

8. The compound of claim 6, wherein the polyether group of $R^4$ has the formula -D-O$(C_mH_{2m}O)_qR^3$, wherein D is a divalent linking group, subscript m is independently selected from 2 to 4 in each moiety indicated by subscript q; subscript q is from 1 to 200; and $R^3$ is selected from $R^1$, H, and —C(O)$R^1$, where $R^1$ is independently selected and defined above.

9. The compound of claim 6, wherein the polyether group of $R^4$ has the formula -D-O$(C_2H_4O)_x(C_3H_6O)_y(C_4H_8O)_zR^3$, wherein D is a divalent linking group; 0≤x≤200; 0≤y≤200; and 0≤z≤200; with the provisos that x, y and z are not simultaneously 0 and units indicated by subscripts x, y and z may be in randomized or block form in the polyether group; and $R^3$ is selected from $R^1$, H, and —C(O)$R^1$, where $R^1$ is independently selected and defined above.

10. A surfactant comprising the compound of claim 6.

11. An isocyanate-reactive component, comprising:

a polyol; and a surfactant, wherein the surfactant comprises the compound of claim 6.

12. A composition, comprising:

(1) the isocyanate-reactive component of claim 11;

(2) an isocyanate component comprising a polyisocyanate; and a catalyst.

13. The composition of claim 12, wherein: (i) the polyol comprises a polyether polyol and/or a polyester polyol; (ii) the polyisocyanate comprises polymeric diphenylmethane diisocyanate; (iii) the composition further comprises a blowing agent; (iv) the composition comprises the surfactant in an amount of from 0.1 to 10 wt. % based on the total weight of the composition; or (v) any combination of (i) to (iv).

14. A method of preparing an article, said method comprising:

reacting the isocyanate-reactive component of claim 11 and an isocyanate component comprising a polyisocyanate in the presence of a catalyst and a blowing agent to give the article;

wherein the article comprises a polyurethane foam and/or a polyisocyanurate foam.

15. An article comprising the reaction product of the composition of claim 12.

16. An article comprising formed according to the method of claim 14.

17. An isocyanate-reactive component, comprising:

a polyol; and a surfactant, wherein the surfactant comprises the silicone polyether surfactant of claim 5.

18. A composition, comprising:

(1) the isocyanate-reactive component of claim 17;

(2) an isocyanate component comprising a polyisocyanate; and a catalyst.

* * * * *